US012706714B2

(12) United States Patent
Lee

(10) Patent No.: US 12,706,714 B2
(45) Date of Patent: Aug. 11, 2026

(54) METHOD AND DEVICE FOR PROVIDING REMOTE INTERFERENCE MANAGEMENT REFERENCE SIGNAL, AND STORAGE MEDIUM

(71) Applicant: Samsung Electronics Co., Ltd., Suwon-si (KR)

(72) Inventor: Dongjae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 593 days.

(21) Appl. No.: 18/295,527

(22) Filed: Apr. 4, 2023

(65) Prior Publication Data

US 2023/0239112 A1 Jul. 27, 2023

Related U.S. Application Data

(63) Continuation of application No. PCT/KR2021/013659, filed on Oct. 6, 2021.

(30) Foreign Application Priority Data

Oct. 7, 2020 (KR) ........................ 10-2020-0129305

(51) Int. Cl.
*H04L 5/00* (2006.01)
*H04L 27/26* (2006.01)

(52) U.S. Cl.
CPC ...... *H04L 5/0051* (2013.01); *H04L 27/26025* (2021.01); *H04L 27/2605* (2013.01)

(58) Field of Classification Search
CPC ............. H04L 5/0051; H04L 27/26025; H04L 27/2605; H04L 5/0007; H04L 27/2675;
(Continued)

(56) References Cited

U.S. PATENT DOCUMENTS 12,284,128 B2 * 4/2025 Lee ...................... H04B 17/318
2020/0059943 A1 * 2/2020 Ren ..................... H04W 72/541
(Continued)

FOREIGN PATENT DOCUMENTS

CA 3021219 C * 6/2024 ........... H04L 5/0023
CN 111130730 A 5/2020
(Continued)

OTHER PUBLICATIONS

E. Peralta et al., "Reference Signal Design for Remote Interference Management in 5G New Radio," 2019 European Conference on Networks and Communications (EuCNC), Valencia, Spain, 2019 (Year: 2019).*

(Continued)

*Primary Examiner* — Ayaz R Sheikh
*Assistant Examiner* — Louis Samara
(74) *Attorney, Agent, or Firm* — Jefferson IP Law, LLP

(57) ABSTRACT

An electronic device in a wireless communication system is provided. The electronic device includes a communication circuit, a memory, and a processor, wherein the memory stores instructions that cause the processor to identify a difference between a carrier frequency for communication with a terminal and a reference point set for a remote interference management (RIM) reference signal (RS), identify a first share obtained by dividing the difference into subcarrier intervals, and the remainder, rotate the phase of at least one subcarrier in a first orthogonal frequency-division multiplexing (OFDM) symbol including at least the other part of the RIM RS, based on at least one from among a cyclic prefix (CP) length of a second OFDM symbol including at least a part of the RIM RS, the carrier frequency, and the remainder, and rotate the phase of a subcarrier in the second OFDM symbol based on the carrier frequency.

20 Claims, 16 Drawing Sheets

(58) Field of Classification Search
CPC ............ H04L 27/2657; H04L 27/2607; H04B 17/318; H04W 72/541
See application file for complete search history.

(56) References Cited

U.S. PATENT DOCUMENTS

| | | | | |
|---|---|---|---|---|
| 2020/0106589 | A1* | 4/2020 | Xu | H04L 5/0073 |
| 2020/0107227 | A1* | 4/2020 | Xu | H04L 5/1469 |
| 2021/0376981 | A1* | 12/2021 | Shen | H04L 5/0094 |
| 2023/0239112 | A1* | 7/2023 | Lee | H04L 27/2605 370/329 |
| 2023/0353302 | A1* | 11/2023 | Pei | H04L 5/0048 |

FOREIGN PATENT DOCUMENTS

| | | | | |
|---|---|---|---|---|
| CN | 111182573 A | | 5/2020 | |
| CN | 111585726 A | | 8/2020 | |
| JP | 7369194 B2 | * | 10/2023 | H04L 5/001 |
| WO | 2020/034435 A1 | | 2/2020 | |
| WO | 2020/092820 A1 | | 5/2020 | |

OTHER PUBLICATIONS

International Search Report dated Dec. 31, 2021, issued in International Patent Application No. PCT/KR2021/013659.
R1-1814268,On RIM RS generation, transmission occasion and circularity characteristic; Nov. 19, 2018.
3GPP; TSG RAN; Study on remote interference management for NR (Release 16); Mar. 27, 2019.
R1-1813899,Discussion on RS design for RIM; Nov. 11, 2018.
R1-1813890,On RIM reference signal design; Nov. 11, 2018.
Reference Signal Design for Remote Interference Management in 5G New Radio; 2019.
Korean Office Action dated Aug. 21, 2025, issued in a Korean Patent Application No. 10-2020-0129305.

* cited by examiner

Compute configured reference point and carrier frequency for all other channels and signals

```
if arfcn_other <= 599999
    f0 = (0 + 5* (arfcn_other-0))*10; % in 100Hz
    if f_shift_7p5_other == 1
        f0 = f0 + 75 ;
    end
else % 599999 < arfcn_other <= 2016666
    f0 = (3000*10^3 + 15*(arfcn_other-600000))*10; % in 100Hz
    if f_shift_7p5_other == 1
        f0 = f0 + 75 ;
    end
end

if arfcn_other <= 599999
    f0_rim = (0 + 5* (arfcn_other-0))*10; % in 100Hz
    if f_shift_7p5_rim == 1
        f0_rim = f0_rim + 75 ;
    end
else % arfcn_rim <= 2016666
    f0_rim = (3000*10^3 + 15*(arfcn_rim-600000))*10; % in 100Hz
    if f_shift_7p5_rim == 1
        f0_rim = f0_rim + 75 ;
    end
end
```

FIG.3

Compute k2, p and nco_value

```
if RIM_mu == 0
    scs = 15 ; % kHz
else % RIM_mu == 1
    scs = 30 ; % kHz
end

fd = f0 - f0_rim; % in 100Hz (multiple of 2.5kHz)
temp = mod(fd, scs*10) ; % 10 to have a value in 100 Hz
if temp >= scs*5
    k2 = ceil(fd/(scs*10));
    delta = temp - scs*10; % in 100Hz
else
    k2 = floor(fd/(scs*10));
    delta = temp; % in 100Hz
end
p = (f0 - delta)/25; % always positive integer
nco_value = mod(delta/25, 49152);
```

FIG.12

Compute physical subcarrier index and RIM RS index

```
if size_fft_other == 0
    n_fft = 256;
elseif size_fft_other == 1
    n_fft = 512;
elseif size_fft_other == 2
    n_fft = 1024;
elseif size_fft_other == 3
    n_fft =  2048;
elseif size_fft_other == 4
    n_fft =  4096;
else
    error ('size_fft_other must lie within [0,4]');
end

n_re = N_RB * 12 ;
n_re _rim = N_RIM_RB * 12 ;

f_start = RIM_f_offset_start - k2 ;
f_end = RIM_f_offset_start - k2  + n_re_rim - 1 ;
if f_start > n_re/2 -1
    error ('Starting freq.(=%d) of RIM RS is bigger than N_RE/2-1(=%d).',f_start,n_re/2-1);
elseif f_end < -n_re/2
    error ('Ending freq.(=%d) of RIM RS is smaller than -N_RE/2(=%d).',f_end,-n_re/2);
end

temp = mod(max(-n_re/2,f_start),n_fft);
idx_sc_start = mod(temp - (n_fft-n_re/2),n_fft);
temp = mod(min(n_re/2-1,f_end),n_fft);
idx_sc_end = mod(temp - (n_fft-n_re/2),n_fft);
length_sc = idx_sc_end-idx_sc_start + 1;

temp = f_start + n_re/2;
if temp >= 0 % rim rs lies at the right of the lower edge of tx BW
    idx_rim_start = 0;
else % rim rs lies at the left of the lower edge of tx BW
    idx_rim_start = -temp;
end
```

FIG.14

METHOD AND DEVICE FOR PROVIDING REMOTE INTERFERENCE MANAGEMENT REFERENCE SIGNAL, AND STORAGE MEDIUM

CROSS-REFERENCE TO RELATED APPLICATION(S)

This application is a continuation application, claiming priority under § 365(c), of an International application No. PCT/KR2021/013659, filed on Oct. 6, 2021, which is based on and claims the benefit of a Korean patent application number 10-2020-0129305, filed on Oct. 7, 2020, in the Korean Intellectual Property Office, the disclosure of which is incorporated by reference herein in its entirety.

BACKGROUND

1. Field

The disclosure relates to a method and a device for transmitting a new radio (NR) remote interference management (RIM) reference signal (RS).

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency (millimeter wave (mmWave)) bands (e.g., 60 gigahertz (GHz) bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth for connection between things have been recently researched. An IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

Under certain climatic conditions, the Earth's atmosphere at high altitudes has low density and may have a low refractive index, which may cause a radio signal to bend toward the Earth. Refraction and reflection may occur on the boundary between the atmospheric layer having a relatively low refractive index and the atmospheric layer having a relatively high refractive index, and thus a radio signal may be transmitted along the atmospheric layer having the relatively high refractive index. This transmission may be referred to as atmospheric waveguide, which may cause a radio signal to experience slight attenuation and to reach a long distance far beyond a normal radiation range. This atmospheric waveguide phenomenon may usually occur in seasonal changes between spring and summer and between summer and autumn on a continent, and may occur in winter on the coast. It is known that this atmospheric waveguide phenomenon may occur over a frequency range from 0.3 GHz to 30 GHz.

In a time division duplex (TDD) network having an uplink and a downlink in one spectrum, a gap period exists to prevent interference between an uplink signal and a downlink signal. However, when the foregoing waveguide phenomenon occurs, a radio signal may travel a very long distance, and a propagation delay time of a radio signal exceeds the length of the gap period. In this case, a downlink signal of an aggressor base station causing interference acts as interference in an uplink period of a victim base station distant from the aggressor base station. This interference may be defined as remote interference. The more distant the aggressor base station is from the victim base station, the further delayed downlink signal the victim base station receives in uplink symbols after the gap period, and thus the more uplink symbols of the victim base station are subjected to interference. RANI responsible for standardization of NR Release 16 has completed an RIM RS standard so that an aggressor base station as an interference source may determine which victim base station receives an interfering signal. All base stations operating in TDD may measure the amount of interference in gap and uplink periods, and may determine that the base stations suffer from interference when interference greater than a thermal noise power level is detected. A victim base station may transmit a RIM RS in a downlink period by using three resources, that is, a time, a frequency, and a sequence identifier (ID), allocated to each base station, and neighboring base stations may detect a RIM RS in an uplink period to know which base station's uplink signal is contaminated by this interference. A transmitted orthogonal frequency-division multiplexing (OFDM) signal of an NR RIM RS may have a length twice the length of an OFDM signal for a different channel and/or signal in the downlink period.

Aspects of the disclosure are to address at least the above-mentioned problems and/or disadvantages and to provide at least the advantages described below. Accordingly, an aspect of the disclosure is to provide a transmission method for the different channel and/or signal that is reused by performing appropriate signal processing on a relatively long OFDM signal.

Additional aspects will be set forth in part in the description which follows and, in part, will be apparent from the description, or may be learned by practice of the presented embodiments.

In accordance with an aspect of the disclosure, an electronic device in a wireless communication system is provided. The electronic device includes a communication circuit, a memory, and at least one processor, wherein the memory may store instructions that are configured, when executed, to cause the at least one processor to identify a difference between a carrier frequency for communication with a terminal and a reference point configured for a remote interference management (RIM) reference signal (RS), identify a first quotient and a remainder obtained by dividing the difference by a subcarrier spacing, rotate a phase of at least one subcarrier in a first orthogonal frequency-division multiplexing (OFDM) symbol comprising at least part of the RIM RS, based on at least one of a cyclic prefix (CP) length of a second OFDM symbol comprising at least different part of the RIM RS, the carrier frequency, or the remainder, and rotate a phase of at least one subcarrier in the second OFDM symbol, based on at least one of the carrier frequency or the remainder.

In accordance with another aspect of the disclosure, a method for providing a remote interference management (RIM) reference signal (RS) by an electronic device in a wireless communication system is provided. The method includes identifying a difference between a carrier frequency for communication with a terminal and a reference point configured for a RIM RS, identifying a first quotient and a remainder obtained by dividing the difference by a subcarrier spacing, rotating a phase of at least one subcarrier in a first orthogonal frequency-division multiplexing (OFDM) symbol including at least part of the RIM RS, based on at least one of a cyclic prefix (CP) length of a second OFDM symbol comprising at least different part of the RIM RS, the carrier frequency, or the remainder, and rotating a phase of at least one subcarrier in the second OFDM symbol, based on at least one of the carrier frequency or the remainder.

In accordance with another aspect of the disclosure, a non-transitory storage medium that stores commands, wherein the commands may be configured to cause at least one processor to perform at least one operation when executed by the at least one processor is provided. The at least one operation includes identifying a difference between a carrier frequency for communication with a terminal and a reference point configured for a remote interference management (RIM) reference signal (RS), identifying a first quotient and a remainder obtained by dividing the difference by a subcarrier spacing, rotating a phase of at least one subcarrier in a first orthogonal frequency-division multiplexing (OFDM) symbol including at least part of the RIM RS, based on at least one of a cyclic prefix (CP) length of a second OFDM symbol comprising at least different part of the RIM RS, the carrier frequency, or the remainder, and rotating a phase of at least one subcarrier in the second OFDM symbol, based on at least one of the carrier frequency or the remainder.

According to various embodiments of the disclosure, phase rotation and frequency shift/transition may be performed on two symbols of a RIM RS, thereby providing a zero-phase function between a CP for a different channel and signal and a net OFDM symbol and achieving a circular feature in a time domain and reuse of an RF carrier frequency.

According to various embodiments of the disclosure, phase rotation may be applied with less computation by using a cosine and sine table.

According to various embodiments of the disclosure, when phase rotation is applied, a required input signal may be concisely defined to minimize an interface with a higher layer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates a pseudo code for computing a carrier frequency for a different channel/signal and a configured reference point for a RIM RS according to an embodiment of the disclosure;

FIG. 12 illustrates a pseudo code for computing k2, p, and nco_value according to an embodiment of the disclosure;

FIG. 14 illustrates a pseudo code for computing a subcarrier index and a RIM RS index according to an embodiment of the disclosure;

Throughout the drawings, it should be noted that like reference numbers are used to depict the same or similar elements, features, and structures.

DETAILED DESCRIPTION

Figure 1:
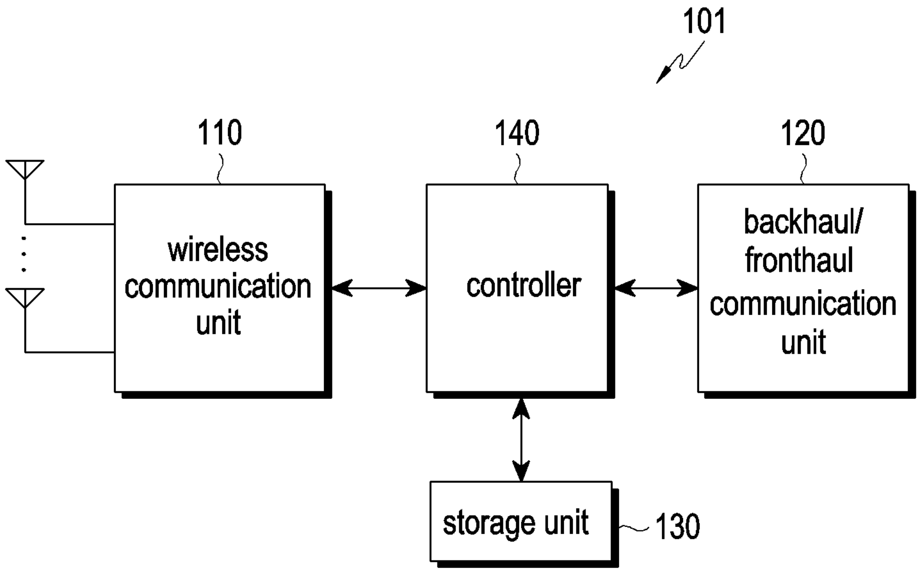
FIG. 1 illustrates a configuration of an electronic device in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the disclosure, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Furthermore, according to some embodiments of the disclosure, the "unit" may include one or more processors.

A wireless communication system is advancing to a broadband wireless communication system for providing high-speed and high-quality packet data services using communication standards, such as high-speed packet access (HSPA), long-term evolution (LTE), evolved universal terrestrial radio access (E-UTRA), LTE-advanced (LTE-A) or LTE-Pro of third generation partnership project (3GPP), high-rate packet data (HRPD) or ultra-mobile broadband (UMB) of 3GPP2, institute of electrical and electronics engineers (IEEE) 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) or a mobile station (MS) transmits data or control signals to a base station (BS) or eNode B, and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 gigabits per second (Gbps) in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 megahertz (MHz) in a frequency band of 3 to 6 GHz or 6 GHz or more, instead of transmitting signals using a transmission bandwidth up to 20 MHz in a band of 2 GHz used in LTE.

In addition, mMTC is being considered to support application services, such as the Internet of things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also requires a design for assigning a large number of resources in a frequency band in order to secure reliability of a communication link.

The three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

The following detailed description of embodiments of the disclosure is directed to new RAN (NR) as a radio access network and packet core as a core network (5G system, 5G Core Network, or new generation core (NG Core)) which are specified in the 5G mobile communication standards defined by the 3GPP that is a mobile communication standardization group, but based on determinations by those skilled in the art, the main idea of the disclosure may be applied to other communication systems having similar backgrounds or channel types through some modifications without significantly departing from the scope of the disclosure.

In the following description, some of terms and names defined in the 3GPP standards (standards for 5G, NR, LTE, or similar systems) may be used for the convenience of description. However, the disclosure is not limited by these terms and names, and may be applied in the same way to systems that conform other standards. In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

A RIM RS for a long-term evolution (LTE) transmitter and receiver may be carried on 44 resource blocks (RBs) so that the receiver may fully receive the RIM RS. For example, when BW=20 MHz (number of RBs=100), a transmission structure may be used in which one RIM RS is carried on 44 RBs in a low-frequency domain and one RIM RS is carried on 44 RBs in a high-frequency domain. When BW=10 MHz (number of RBs=50), one RIM RS may be carried on 44 RBs in a middle-frequency domain. A RIM RS used in LTE may be viewed as a signal having a circular feature in which two normal CPs are attached to two net OFDM symbols in a time domain. Considering that a RIM RS including two normal CPs and two OSs is within a window with one net OFDM length (which may be referred to as a net OFDM symbol length) of a receiver, in BW=20 MHz, a RIM RS having a delay of 0 to a 2192-sample delay may be received as a signal with one net OFDM length within at least one window without having intersymbol interference (ISI).

In an NR standard, unlike an LTE standard, one RIM RS may be carried on up to 96 RBs in a subcarrier spacing (SCS) of 15 kHz, and one RIM RS may be carried on up to 48 RB or 96 RBs in a SCS of 30 kHz. A fundamental reason why the length of an NR RIM RS may be longer than that of an LTE RIM RS (=44 RBs) is that NR allows greater bandwidth signal transmission than LTE. If a relatively longer RIM RS is allowed, when a plurality of RIM RSs is received as inputs to a receiver, different RIM RSs are more clearly distinguished. Further, in NR, when a channel BW is greater than 80 MHz, it is possible to allocate up to four frequency resources for transmitting a RIM RS within the channel BW. For example, in NR, when a specific base station transmits one RIM RS, it is possible to obtain a frequency diversity gain by using four frequency resources in turn. An LTE RIM RS transmitter may transmit a RIM RS corresponding to a length of 44 RBs based on a specific subcarrier in a spectrum thereof (a grid with a 15-kHz granularity).

A receiver receiving an LTE RIM RS may receive a RIM RS according to a first grid of a specific transmitter. Here, when a second grid of a base station transmitting a different RIM RS is not aligned with the first grid, the receiver may not receive the different RIM RS. A scheduler for an LTE RIM RS may schedule base stations such that two or more different transmission base stations using the same frequency resource (there are two frequency resources for a RIM RS in channel BW=20 MHz) at the same timing do not have unaligned grids. In NR, a plurality of base stations may transmit a RIM RS, based on a configured reference point agreed therebetween, instead of transmitting a RIM RS, based on a grid of a base station as in LTE. An NR RIM RS transmitter may transmit an NR RIM RS after performing frequency correction using a digital mixer having, for example, a 2.5 kHz granularity since a frequency grid of the NR RIM RS transmitter is not guaranteed to be aligned with a configured reference point.

Since a configured reference point for an NR RIM RS and a carrier (or carrier wave) frequency for a different channel and/or signal (i.e., a different signal) are not the same, it is needed to know how far an NR RIM RS predetermined based on the configured reference point is away from the carrier frequency. Through this computation process and a frequency shift by a digital mixer, an NR transmission base station may prevent two carriers of a carrier for RIM RS and a carrier for a different channel and/or signal from being used. For example, the NR transmission base station may transmit a RIM RS and a different channel and/or signal by using only one radio-frequency (RF) carrier frequency.

A base station according to the NR standard is capable of transmitting a wideband signal, while a terminal may receive only a narrowband signal, that is, a bandwidth part (BWP), compared to the base station. Therefore, the base station and the terminal are not guaranteed to have the same carrier frequency. In a case where the base station and the terminal have different carrier frequencies, when the base station and the terminal use the respective carrier frequencies as in existing LTE and the transmitter and the receiver do not perform proper signal processing, phases of a channel experienced in each OFDM symbol may not be the same even though a wireless channel does not change according to time. A demodulation reference signal (DMRS), which is necessary for channel estimation of the receiver but reduces throughput when provided in excessive quantity, does not exist in each OFDM symbol. For example, an OFDM symbol in which a DMRS exists causes no problem in channel estimation even though a channel phase changes, whereas an OFDM symbol in which no DMRS exists may cause a problem in channel estimation even though the channel does not change. Thus, in NR, the transmitter and the receiver perform signal processing so that a phase of a carrier is always 0 at a timing of a boundary between a cyclic prefix (CP) and a net OFDM symbol. However, an NR RIM RS has a relatively long CP and a relatively long waveform with two net OFDM symbols attached, unlike a different channel and/or signal. In addition, a phase of a carrier having a configured reference point as a center frequency at the timing of the boundary between the CP and the net OFDM symbol is standardized to be always zero. For example, a timing at which the phase becomes 0 for a different channel and signal and a timing at which the phase becomes 0 for the RIM RS are different. An operation in which the phase becomes 0 at the timing of the boundary for the different channel and/or signal is achieved in the time domain. Therefore, to reuse a time-domain processor configured for the different channel and/or signal for the RIM RS, an operation of correcting a phase difference due to the foregoing different zero-phase timings in a frequency domain is required.

In addition, since a difference between the configured reference point computed from an absolute radio frequency channel number (ARFCN) value for the RIM RS and an RF carrier frequency computed from an ARFCN value for the different channel/signal is not an integer multiple of a subcarrier spacing (SCS), a value to be transmitted to a component (e.g., a digital mixer or a numerically control oscillator (NCO)) that corrects a fractional frequency difference needs to be computed. According to an embodiment of the disclosure, this computed fractional frequency value may be transmitted to a radio unit (RU) supporting a remote radio head (RRH) through a fronthaul. In addition, the starting position and length of a previously generated RIM RS and the starting position and length of a subcarrier to be actually used may also be computed.

The different channel and/or signal may be mapped to a resource element (RE) in the frequency domain, and may be converted into a time-domain signal by inverse fast Fourier transform (IFFT), after which a CP is attached to the front of the time-domain signal, thereby completing an OFDM signal. CPs may be divided into a normal CP (NCP) and an extended CP (ECP), and NCPs may be divided into a long NCP and a short NCP. Assuming that two OFDM symbols are transmitted, the two OFDM symbols may be transmitted in an order of a CP, a net OFDM symbol, a CP, and a net OFDM symbol. Since transmitting an NR RIM RS by reusing this structure is advantageous in terms of implementation, the foregoing structure may be reused by performing signal processing on a CP and an OFDM signal defined for the RIM RS longer than the different channel and/or signal in the frequency domain.

FIG. 1 illustrates the configuration of an electronic device in a wireless communication system according to an embodiment of the disclosure. Terms 'unit', '-or/er', and the like to be used herein indicate a unit for processing at least one function or operation, which may be implemented by hardware, software, or a combination thereof.

The electronic device 101 may include a wireless communication unit 110, a backhaul/fronthaul communication unit 120, a storage unit 130, and a controller 140.

According to an embodiment of the disclosure, the electronic device 101 may be a base station that provides wireless access for terminals or communicates with a neighboring base station. The electronic device 101 may be referred to as an access point (AP), an eNodeB (eNB), a $5^{th}$-generation (5G) node, a next-generation nodeB (gNB), a wireless point, a transmission/reception point (TRP), or other terms with equivalent technical meanings, in addition to a base station.

The wireless communication unit 110 may perform functions for transmitting or receiving a signal through a wireless channel. For example, the wireless communication unit 110 may perform a function of conversion between a baseband signal and a bit stream according to the physical layer specification of a system. For example, in data transmission, the wireless communication unit 110 may encode and modulate a transmitted bit stream to generate complex symbols. Further, in data reception, the wireless communication unit 110 may demodulate and decode a baseband signal to reconstruct a received bit stream.

The wireless communication unit 110 may upconvert a baseband signal into a radio-frequency (RF) band signal to transmit the RF band signal through an antenna, and may downconvert an RF band signal, received through the antenna, into a baseband signal. To this end, the wireless communication unit 110 may include a transmission filter, a reception filter, an amplifier, a digital mixer, an oscillator, a digital-to-analog converter (DAC), an analog-to-digital converter (ADC), or the like. Further, the wireless communication unit 110 may include a plurality of transmission/reception paths. In addition, the wireless communication unit 110 may include at least one antenna array including a plurality of antenna elements.

From the aspect of hardware, the wireless communication unit 110 may include a digital unit and an analog unit, and the analog unit may include a plurality of sub-units according to operating power, operating frequency, or the like. The digital unit may be configured as at least one processor (e.g., a digital signal processor (DSP)).

As described above, the wireless communication unit 110 may transmit and receive a signal. Accordingly, the wireless communication unit 110 may entirely or partly be referred to as a transmitter, a receiver, or a transceiver. In the following description, transmission and reception performed through a wireless channel may be construed as including processing performed as above by the wireless communication unit 110.

The backhaul/fronthaul communication unit 120 may provide an interface for performing communication with other nodes in a network. For example, the backhaul/fronthaul communication unit 120 may convert a bit stream, which is transmitted from the base station to another node, for example, another access node, another base station, a higher node, a core network, or the like, into a physical signal, and may convert a physical signal, which is received from another node, into a bit stream.

The storage unit 130 may store data, such as a default program, an application, and setting information, for the operation of the base station. The storage unit 130 may be configured as a volatile memory, a nonvolatile memory, or a combination of a volatile memory and a nonvolatile memory. The storage unit 130 may provide the stored data in response to a request from the controller 140.

The controller 140 may control overall operations of the base station according to various embodiments to be described below. For example, the controller 140 may transmit and receive a signal through the wireless communication unit 110 or the backhaul/fronthaul communication unit 120. Further, the controller 140 may record and read data in the storage unit 130. The controller 140 may perform functions of a protocol stack required by the communication standards. According to another embodiment of the disclosure, the protocol stack may be included in the wireless communication unit 110. To this end, the controller 140 may include at least one processor.

According to various embodiments of the disclosure, an electronic device in a wireless communication system may include a communication circuit, a memory, and at least one processor, wherein the memory may store instructions that are configured, when executed, to cause the at least one processor to identify a difference between a carrier frequency for communication with a terminal and a reference point configured for a remote interference management (RIM) reference signal (RS), identify a first quotient and a remainder obtained by dividing the difference by a subcarrier spacing, rotate a phase of at least one subcarrier in a first orthogonal frequency-division multiplexing (OFDM) symbol including at least part of the RIM RS, based on at least one of a cyclic prefix (CP) length of a second OFDM symbol including at least different part of the RIM RS, the carrier frequency, or the remainder, and rotate a phase of at least one subcarrier in the second OFDM symbol, based on at least one of the carrier frequency or the remainder.

According to various embodiments of the disclosure, the instructions, when executed, may cause the at least one processor to rotate the phase of the at least one subcarrier in the first OFDM symbol, at least partly based on a difference between the carrier frequency and the remainder.

According to various embodiments of the disclosure, the instructions, when executed, may cause the at least one processor to rotate the phase of the at least one subcarrier in the first OFDM symbol, based on the CP length of the second OFDM symbol and a difference between the carrier frequency and the remainder.

According to various embodiments of the disclosure, the instructions, when executed, may cause the at least one processor to firstly rotate the phase of the at least one subcarrier in the first OFDM symbol, based on at least one of the CP length of the second OFDM symbol, the carrier frequency, or the remainder and secondly rotate the phase of the at least one subcarrier in the first OFDM symbol, based on at least one of the CP length of the second OFDM symbol or a subcarrier index. According to an embodiment of the disclosure, a first rotation operation and a second rotation operation may be performed in order or in reverse order.

According to various embodiments of the disclosure, the instructions, when executed, may cause the at least one processor to rotate the phase of the at least one subcarrier in the second OFDM symbol, at least partly based on a difference between the carrier frequency and the remainder.

According to various embodiments of the disclosure, the instructions, when executed, may cause the at least one processor to rotate the phase of the at least one subcarrier in the second OFDM symbol, at least partly based on a net OFDM symbol length and a difference between the carrier frequency and the remainder.

According to various embodiments of the disclosure, the instructions, when executed, may cause the at least one processor to identify a second quotient obtained by dividing a difference between the carrier frequency and the remainder by a granularity of a digital mixer, obtain a phase sum, based on at least one of the second quotient or a subcarrier index, identify a complex number corresponding to the phase sum, and rotate the phase of the at least one subcarrier in the first OFDM symbol, based on the complex number.

According to various embodiments of the disclosure, the instructions, when executed, may cause the at least one processor to identify the complex number corresponding to the phase sum, at least partly based on a cosine and sine table or a Taylor expansion.

According to various embodiments of the disclosure, the instructions, when executed, may cause the at least one processor to multiply the complex number by a quadrature phase shift keying (QPSK) symbol of the RIMS RS.

According to various embodiments of the disclosure, the instructions, when executed, may cause the at least one processor to: identify a second quotient obtained by dividing a difference between the carrier frequency and the remainder by a granularity of a digital mixer, obtain a phase sum, based on at least one of the second quotient or a subcarrier index, identify a complex number corresponding to the phase sum, and rotate the phase of the at least one subcarrier in the second OFDM symbol, based on the complex number.

Figure 2:
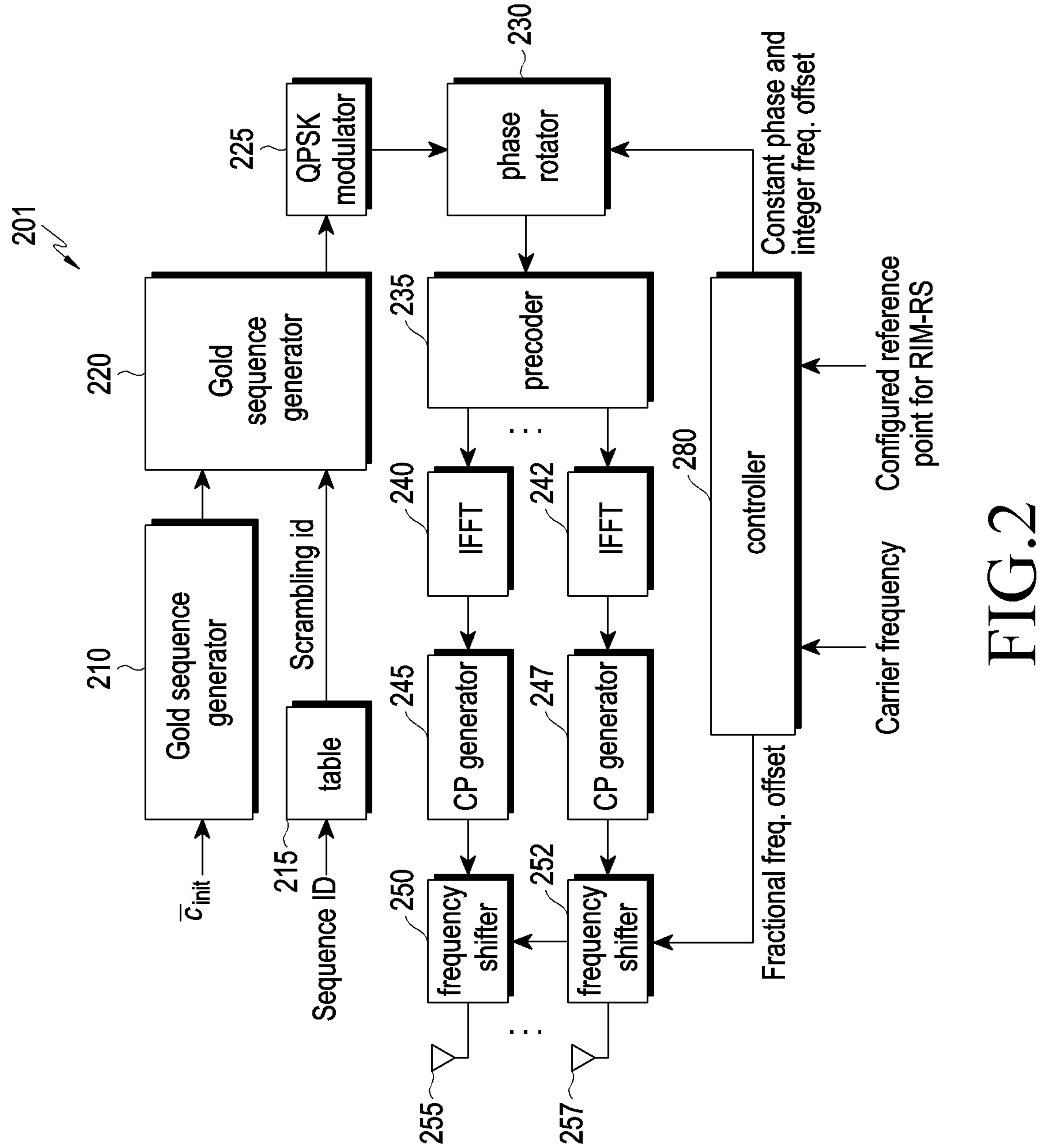
FIG. 2 is a block diagram of a new radio (NR) remote interference management (RIM) reference signal (RS) transmitter according to an embodiment of the disclosure.

FIG. 2 is a block diagram of an NR RIM RS transmitter according to an embodiment of the disclosure.

Referring to FIG. 2 may be construed as a component of an electronic device (e.g., the electronic device 101 or the base station) or a transmitter/wireless communication unit. Terms 'unit', '-or/er', and the like to be used herein indicate a unit for processing at least one function or operation, which may be implemented by hardware, software, or a combination thereof.

A transmitter 201 (e.g., the wireless communication unit 110) may include a first Gold sequence generator 210, a second Gold sequence generator 220, a QPSK modulator 225, a phase rotator 230, and a precoder 235, first to nth inverse fast Fourier transformers 240 and 242, first to nth CP generators 245 and 247, first to nth frequency shifters 250 and 252, and a controller 280 (e.g., the controller 140). In an embodiment of the disclosure, at least one of these components may be omitted from the transmitter 201, or one or more other components may be added thereto. In an embodiment of the disclosure, some of these components may be integrated into a single component.

The first Gold sequence generator 210 may obtain a first Gold sequence (e.g., {QUOTE $\overline{c}_{init}$} or {QUOTE($\overline{c}_{init}$)}) by using an initial value $\overline{c}_{init}$ changing according to an uplink (UL)/downlink (DL) switching period. The first Gold sequence generator 210 may obtain a number based on a square of 2 (or a preset value).

The controller 280 may obtain a scrambling ID corresponding to a sequence ID of a RIM RS by referring to a table 215 storing a correspondence relationship between sequence IDs of RIM RSs and scrambling IDs.

The second Gold sequence generator 220 may obtain a second Gold sequence, based on the first Gold sequence, the number based on the square of 2, and the scrambling ID. The second Gold sequence may have a length twice the number of RIM RS symbols.

The QPSK modulator 225 may map the second Gold sequence to a QPSK symbol.

The phase rotator 230 may perform phase rotation on QPSK symbols by subcarrier. Through this phase rotation, firstly, it is possible to correct different timings at which phases of carrier frequencies become 0 at a specific timing in the time domain, and secondly, a circular shift may be achieved in the time domain.

The precoder 235 may multiply the phase-rotated symbols by precoding coefficients corresponding to Tx antennas 255 and 257.

The first to nth inverse fast Fourier transformers 240 and 242 may perform an inverse fast Fourier transform on the precoded symbols to convert the precoded symbols into OFDM symbols, which are time-domain signals.

The first to nth CP generators 245 and 247 may add a CP to the OFDM symbols.

The first to nth frequency shifters 250 and 252 may perform a frequency shift on the CP-added signals by a value obtained based on a difference between a reference point configured for a RIM RS and a carrier frequency for a different channel and/or signal and a SCS for the RIM RS. According to an embodiment of the disclosure, each frequency shifter may include a digital mixer or may be configured as a digital mixer.

The frequency-shifted signals may be multiplied by an RF carrier frequency by a radio unit (RU) and then transmitted to the air through the antennas 255 and 257.

The controller 280 may obtain a constant phase, an integer frequency offset, and a fractional frequency offset, based on the carrier frequency and the reference point configured for the RIM RS. The controller 280 may provide the constant phase and the integer frequency offset to the phase rotator 230. The phase rotator 230 may perform the phase rotation on the QPSK symbols by subcarrier, based on the constant phase and the integer frequency offset. The controller 280 may provide the fractional frequency offset to the first to nth frequency shifters 250 and 252. The first to nth frequency shifters 250 and 252 may perform the frequency shift on the CP-added signals, based on the fractional frequency offset.

In an embodiment of the disclosure, processes from phase rotation by subcarrier to the frequency shift may be performed twice to generate two OFDM symbols in each RIM RS transmission period, and a QPSK symbol mapping process based on the initial value and the sequence ID of the RIM RS may be performed once in each RIM RS transmission period.

According to an embodiment of the disclosure, some components/functions of the transmitter 201 may be included in the radio unit (RU). The transmitter 201 may transmit the phase-rotated symbols output from the phase rotator 230 to the RU through the backhaul/fronthaul communication unit (e.g., the backhaul/fronthaul communication unit 120), and the RU may include the precoder 235, the first to nth inverse fast Fourier transformers 240 and 242, the first to nth CP generators 245 and 247, and the first to nth frequency shifters 250 and 252, or may perform functions thereof.

According to an embodiment of the disclosure, the transmitter 201 may transmit the precoded symbols output from the precoder 235 to the RU through the backhaul/fronthaul communication unit, and the RU may include the first to nth inverse fast Fourier transformers 240 and 242, the first to nth CP generators 245 and 247, and the first to nth frequency shifters 250 and 252, or may perform functions thereof.

According to an embodiment of the disclosure, the transmitter 201 may transmit the frequency-shifted signals output from the first to nth frequency shifters 250 and 252 to the RU through the backhaul/fronthaul communication unit, and the RU may multiply the frequency-shifted signals by the RF carrier frequency, and may then transmit the signals to the air through the antennas.

A baseband signal for the RIM RS may be expressed as follows.

$$S_l^{(p,\mu)}(t) = \sum_{k=0}^{L_{RIM}-1} a_k^{(p,RIM)} e^{j2\pi(k+k_1)\Delta f_{RIM}\left(t-N_{CP,l}^{RIM}T_c-t_{start,l_0}^{\mu}\right)} \quad \text{Equation (1)}$$

$$s_l^{(p,\mu)}(t)$$

is the baseband signal transmitted at a time t for symbol with a port p and a SCS index μ. The time t exists in a period $$t_{start,l_0}^{RIM} \le t < t_{start,l_0}^{RIM} + N_{CP}^{RIM}T_c + N_u^{RIM}T_c.\ t_{start,l_0}^{RIM}$$

is a start point of the baseband signal for the RIM RS.

$$N_{CP}^{RIM}T_c$$

is the length of a CP of the RIM RS, and $$N_u^{RIM} T_c$$

is twice a net OFDM length. $L_{RIM}$ is the number of subcarriers for the RIM RS. When a frequency resource corresponding to 96 RBs is allocated to the RIM RS, $$L_{RIM} = 96 \times 12 = 1152.\ a_k^{(p,RIM)}$$

is a QPSK symbol of the port p and a subcarrier k. $k_1$ is an index of a resource element to which a RIM RS QPSK symbol is first mapped. $\Delta f_{RIM}$ is a SCS for the RIM RS. In an NR Release 16 standard, two SCS values, which are 15 kHz (μ=0) and 30 kHz (μ=1), are defined.

An RF signal $$x_l^{(p,\mu)}(t)$$

multiplied by a carrier having a frequency of a reference point configured for the RIM RS may be expressed as follows.

$$x_l^{(p,\mu)}(t) = s_l^{(p,\mu)}(t) e^{j2\pi f_0^{RIM}\left(t - t_{start,l_0}^{\mu} - N_{CP}^{RIM} T_c\right)} \quad \text{Equation 2}$$

$$f_0^{RIM}$$

is the reference point configured for the RIM RS. Equation 2 shows that a phase of the carrier frequency at $$t = t_{start,l_0}^{RIM} + N_{CP}^{RIM} T_c \text{ is } 0.$$

A frequency $f_O$ is defined as a carrier frequency for a different channel and/or signal. Then, a difference $f_d$ between the carrier frequency and the configured reference point may be defined.

$$f_d = f_0 - f_0^{RIM} \quad \text{Equation 3}$$

The frequency difference $f_d$ may be expressed as follows.

$$f_d = k_2 \Delta f_{RIM} + \delta \quad \text{Equation 4}$$

$k_2$ is an integer, and $\delta \in [-\Delta f_{RIM}/2, \Delta f_{RIM}/2]$. Equation 5 may be obtained by putting Equation 4 into Equation 3. $k_2 \Delta f_{RIM}$ and δ may respectively correspond to an integer frequency offset and a fractional frequency offset obtained by the controller 280 of FIG. 2.

$$f_0^{RIM} = f_0 - k_2 \Delta f_{RIM} - \delta \quad \text{Equation 5}$$

δ is an integer multiple of 2.5 kHz.

FIG. 3 illustrates a pseudo code for computing a carrier frequency for a different channel/signal and a configured reference point for a RIM RS according to an embodiment of the disclosure.

FIG. 3 shows a pseudo code for computing a carrier frequency for a different channel/signal and a configured reference point for a RIM RS, based on two ARFCN values (arfcn_other and arfcn_rim) and two f_shift_7.5 kHz values (f_shift_7p5_other and f_shift_7p5_rim) (or preset values).

According to an embodiment of the disclosure, a controller (e.g., the controller 140 or 280) of a base station (e.g., the base station 101) may obtain the carrier frequency for the different channel/signal and the configured reference point for the RIM RS, based on an ARFCN for the RIM RS and an ARFCN (and preset values) for the channel/signal.

Figure 4:
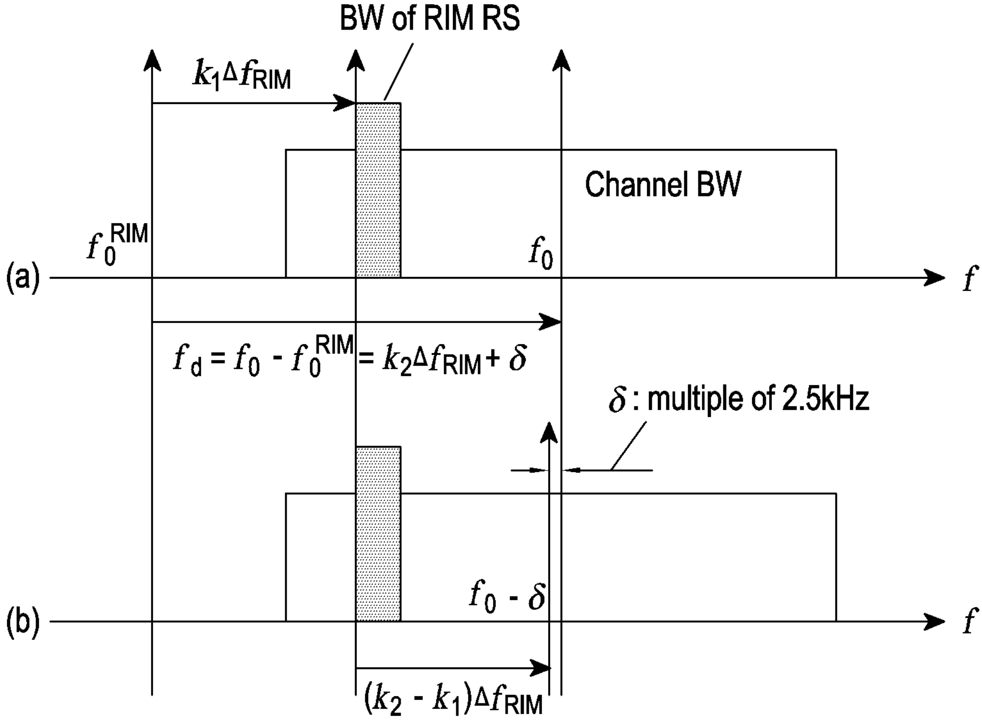
FIG. 4 illustrates a channel bandwidth and a spectrum in which a RIM RS is located in a frequency domain according to an embodiment of the disclosure.

FIG. 4 illustrates a channel bandwidth (BW) and a spectrum in which a RIM RS is located in the frequency domain according to an embodiment of the disclosure.

Referring to part (a) of FIG. 4, to reuse an RF carrier frequency $f_O$ for a different channel and/or signal for the RIM RS, a digital mixer (or the frequency shifters 250 and 252) is required to perform a frequency shift/transition by −δ.

Referring to part (b) of FIG. 4, the spectrum of the RIM RS distant by $k_1 \Delta f_{RIM}$ from $$f_0^{RIM}$$

is distant by $(k_1-k_2)\Delta f_{RIM}$ from $f_0-\delta$.

According to an embodiment of the disclosure, the wireless communication unit 110, the transmitter 201, or the phase rotator 230 may perform a frequency shift by $(k_1-k_2)\Delta f_{RIM}$, and the wireless communication unit 110, the transmitter 201, or the frequency shifters 250 and 252 may perform a frequency shift by −δ.

Figure 5:
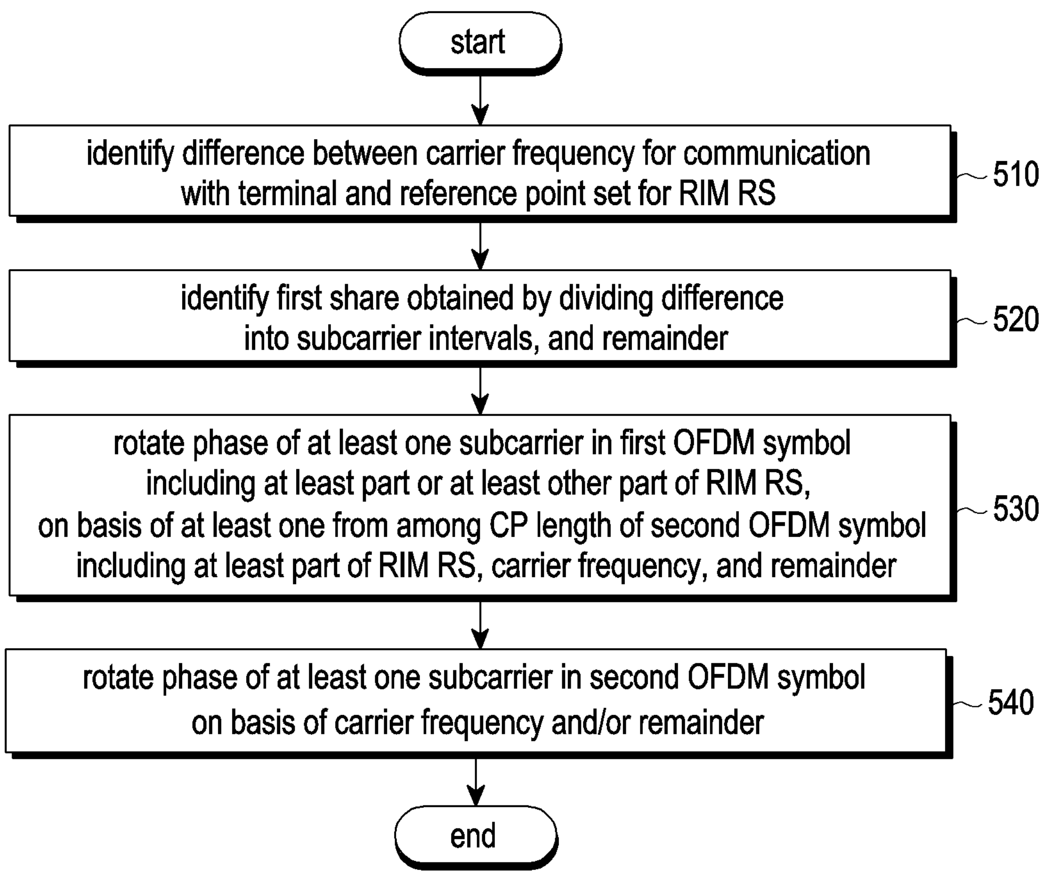
FIG. 5 is a flowchart illustrating a method for providing a remote interference management reference signal by an electronic device in a wireless communication system according to an embodiment of the disclosure.

FIG. 5 is a flowchart illustrating a method for providing a remote interference management (RIM) reference signal (RS) by an electronic device in a wireless communication system according to an embodiment of the disclosure.

Referring to FIG. 5, a processor (e.g., the controller 140 of FIG. 1 or the controller 280 of FIG. 2) of an electronic device (e.g., the base station 101 of FIG. 1 or the transmitter 201 of FIG. 2) according to an embodiment may perform at least one of operation 510 to operation 540.

In operation 510, the electronic device may identify a difference between a carrier frequency for communication with a terminal (or for a different channel and/or signal) and a reference point configured for a RIM RS.

According to an embodiment of the disclosure, the electronic device may compute the difference $f_d$ between the carrier frequency $f_O$ for communication with the terminal (or for the different channel and/or signal) and the reference point configured for the RIM RS.

In operation 520, the electronic device may identify a first quotient and a remainder obtained by dividing the difference between the carrier frequency and the configured reference point by a subcarrier spacing.

According to an embodiment of the disclosure, the electronic device may compute the first quotient $k_2$ and a remainder δ obtained by dividing the difference $f_d$ between the carrier frequency and the configured reference point by the subcarrier spacing.

In operation 530, the electronic device may rotate a phase of at least one subcarrier in a first OFDM symbol including at least part of the RIM RS, based on at least one of a cyclic prefix (CP) length of a second OFDM symbol including at least different part of the RIM RS, the carrier frequency, or the remainder.

According to an embodiment of the disclosure, the electronic device may rotate a phase of each carrier in the first OFDM symbol including the at least different part (second part) or the at least part (first part) of the RIM RS by the same value computed based on the CP length of the second OFDM symbol including the at least different part (second part) of the RIM RS and an offset (or difference) between the carrier frequency and the remainder δ.

According to an embodiment of the disclosure, the electronic device may apply different phase shifts/transitions computed based on the CP length of the second OFDM symbol and a subcarrier index to each subcarrier in the first OFDM symbol including the at least part (first part) of the RIM RS.

In operation 540, the electronic device may rotate a phase of at least one subcarrier within the second OFDM symbol, based on at least one of the carrier frequency and the remainder.

According to an embodiment of the disclosure, the electronic device may rotate a phase of each subcarrier in the second OFDM symbol including the at least different part (second part) of the RIM RS by the same value computed based on a net OFDM length and the offset (or difference) between the carrier frequency and the remainder δ.

According to various embodiments of the disclosure, a method for providing a remote interference management (RIM) reference signal (RS) by an electronic device in a wireless communication system may include identifying a difference between a carrier frequency for communication with a terminal and a reference point configured for a RIM RS, identifying a first quotient and a remainder obtained by dividing the difference by a subcarrier spacing, rotating a phase of at least one subcarrier in a first orthogonal frequency-division multiplexing (OFDM) symbol including at least part of the RIM RS, based on at least one of a cyclic prefix (CP) length of a second OFDM symbol including at least different part of the RIM RS, the carrier frequency, or the remainder, and rotating a phase of at least one subcarrier in the second OFDM symbol, based on at least one of the carrier frequency or the remainder.

According to various embodiments of the disclosure, the rotating of the phase of the at least one subcarrier in the first OFDM symbol may be at least partly based on a difference between the carrier frequency and the remainder.

According to various embodiments of the disclosure, the rotating of the phase of the at least one subcarrier in the first OFDM symbol may be at least partly based on the CP length of the second OFDM symbol and a difference between the carrier frequency and the remainder.

According to various embodiments of the disclosure, the rotating of the phase of the at least one subcarrier in the first OFDM symbol may include firstly rotating the phase of the at least one subcarrier in the first OFDM symbol, based on at least one of the CP length of the second OFDM symbol, the carrier frequency, or the remainder and secondly rotating the phase of the at least one subcarrier in the first OFDM symbol, based on at least one of the CP length of the second OFDM symbol or a subcarrier index. According to an embodiment of the disclosure, a first rotation operation and a second rotation operation may be performed in order or in reverse order.

According to various embodiments of the disclosure, the rotating of the phase of the at least one subcarrier in the second OFDM symbol may be at least partly based on a difference between the carrier frequency and the remainder.

According to various embodiments of the disclosure, the rotating of the phase of the at least one subcarrier in the second OFDM symbol may be at least partly based on a net OFDM symbol length and a difference between the carrier frequency and the remainder.

According to various embodiments of the disclosure, the rotating of the phase of the at least one subcarrier in the first OFDM symbol may include identifying a second quotient obtained by dividing a difference between the carrier frequency and the remainder by a granularity of a digital mixer, obtaining a phase sum, based on at least one of the second quotient or a subcarrier index, identifying a complex number corresponding to the phase sum, and rotating the phase of the at least one subcarrier in the first OFDM symbol, based on the complex number.

According to various embodiments of the disclosure, the identifying of the complex number corresponding to the phase sum may be at least partly based on a cosine and sine table or a Taylor expansion.

According to various embodiments of the disclosure, the rotating of the phase of the at least one subcarrier in the first OFDM symbol, based on the complex number may include multiplying the complex number by a quadrature phase shift keying (QPSK) symbol of the RIMS RS.

According to various embodiments of the disclosure, the rotating of the phase of the at least one subcarrier in the second OFDM symbol may include identifying a second quotient obtained by dividing a difference between the carrier frequency and the remainder by a granularity of a digital mixer, obtaining a phase sum, based on at least one of the second quotient or a subcarrier index, identifying a complex number corresponding to the phase sum, and rotating the phase of the at least one subcarrier in the second OFDM symbol, based on the complex number.

A phase rotation process for transmitting a RIM RS is described as follows.

A period $$t_{start,l_0}^{RIM} \le t < t_{start,l_0}^{RIM} + N_{CP,l_0}^{\mu} T_c + N_u^{\mu} T_c$$

corresponding to a first OFDM symbol may be defined. Here, $$N_{CP,l_0}^{\mu} T_c$$

is the length of a CP of the first OFDM symbol, and $$N_u^{\mu} T_c$$

is the length of one net OFDM symbol. In the period of the first OFDM symbol, Equation 2 may be expressed as follows by putting Equation 1 into Equation 2 and Equation 5 into Equation 2.

$$x_l^{(p,\mu)}(t) = \left[ \sum_{k=0}^{L_{RIM}-1} c_{l_0,k}^{(p,RIM)} e^{j2\pi(k+k_1-k_2)\Delta f_{RIM}\left(t - t_{start,l_0}^{\mu} - N_{CP,l_0 T_c}^{\mu}\right)} \right] \qquad \text{Equation 6}$$

-continued $$\underbrace{e^{j2\pi(f_0-\delta)t-t^{\mu}_{start,l_0}-N^{\mu}_{CP,l_0}T_c)}}_{by\ digital\ mixer\ and\ RU}$$

$$b^{(p,RIM)}_{l_0,k}=\lambda^{(d)}_{l_0}a^{(p,RIM)}_k \quad \text{Equation 7}$$

$$\lambda^{(d)}_{l_0}=e^{-j2\pi(f_0-\delta)N^{\mu}_{CP,l_0+1}T_c} \quad \text{Equation 8}$$

$$c^{(p,RIM)}_{l_0,k}=\lambda^{(c)}_{l_0,k}b^{(p,RIM)}_{l_0,k} \quad \text{Equation 9}$$

$$\lambda^{(c)}_{l_0,k}=e^{-j2\pi(k+k_1-k_2)\Delta f_{RIM}N^{\mu}_{CP,l_0+1}T_c} \quad \text{Equation 10}$$

Using Equation 6, a phase difference between QPSK symbols for the RIM RS due to a difference between a timing at which a phase becomes 0 for signaling with a different channel and a timing at which the phase becomes 0 for the RIM RS may be corrected, and the phase may be corrected by subcarrier to achieve a cyclic shift in the time domain. Subsequently, a baseband signal may be upconverted by $f_0-\delta$ by a digital mixer and an RU. A value of Equation 8 may correspond to a constant phase obtained by the controller 280 of FIG. 2. Applying the value of Equation 8 may correspond to operation 530 of FIG. 5 or rotating a phase of each subcarrier in the first OFDM symbol by the same value. Applying a value of Equation 10 may correspond to operation 530 of FIG. 5 or applying different phase shifts/transitions respectively to subcarriers within the first OFDM symbol.

A period $$t^{RIM}_{start,l_{(0+1)}}\le t<t^{RIM}_{start,l_{(0+1)}}+N^{\mu}_{CP,l_{0+1}}T_c+N^{\mu}_{u}T_c$$

corresponding to a second OFDM symbol may be defined.

$$t^{RIM}_{start,l_{0+1}}$$

is a start point of the second OFDM symbol, and $$N^{\mu}_{CP,l_{(0+1)}}T_c$$

is the length of a CP of the second OFDM symbol. In the period of the second OFDM symbol, Equation 2 may be expressed as follows by putting Equation 1 into Equation 2 and Equation 5 into Equation 2.

$$x^{(p,\mu)}_l(t)=\sum_{k=0}^{L_{RIM}-1}b^{(p,RIM)}_{l_0+1,k}e^{j2\pi(k+k_1-k_2)\Delta f_{RIM}\left(t-t^{\mu}_{start,l_0+1}-N^{\mu}_{CP,l_0+1}T_c\right)} \quad \text{Equation 11}$$

$$\underbrace{e^{j2\pi(f_0-\delta)\left(t-t^{\mu}_{start,l_0+1}-N^{\mu}_{CP,l_0+1}T_c\right)}}_{by\ digital\ mixer\ and\ RU}$$

$$b^{(p,RIM)}_{l_0+1,k}=\lambda^{(d)}_{l_0+1}a^{(p,RIM)}_k \quad \text{Equation 12}$$

$$\lambda^{(d)}_{l_0+1}=e^{j2\pi(f_0-\delta)N^{\mu}_{u}T_c} \quad \text{Equation 13}$$

Using Equation 11, a phase difference between QPSK symbols for the RIM RS due to a difference between a timing at which a phase is 0 for signaling with a different channel and a timing at which the phase is 0 for the RIM RS may be corrected. Subsequently, the baseband signal may be upconverted by $f_0-\delta$ by the digital mixer and the RU. Applying a value of Equation 13 may correspond to operation 540 of FIG. 5 or rotating a phase of each subcarrier in the second OFDM symbol by the same value.

Figure 6:
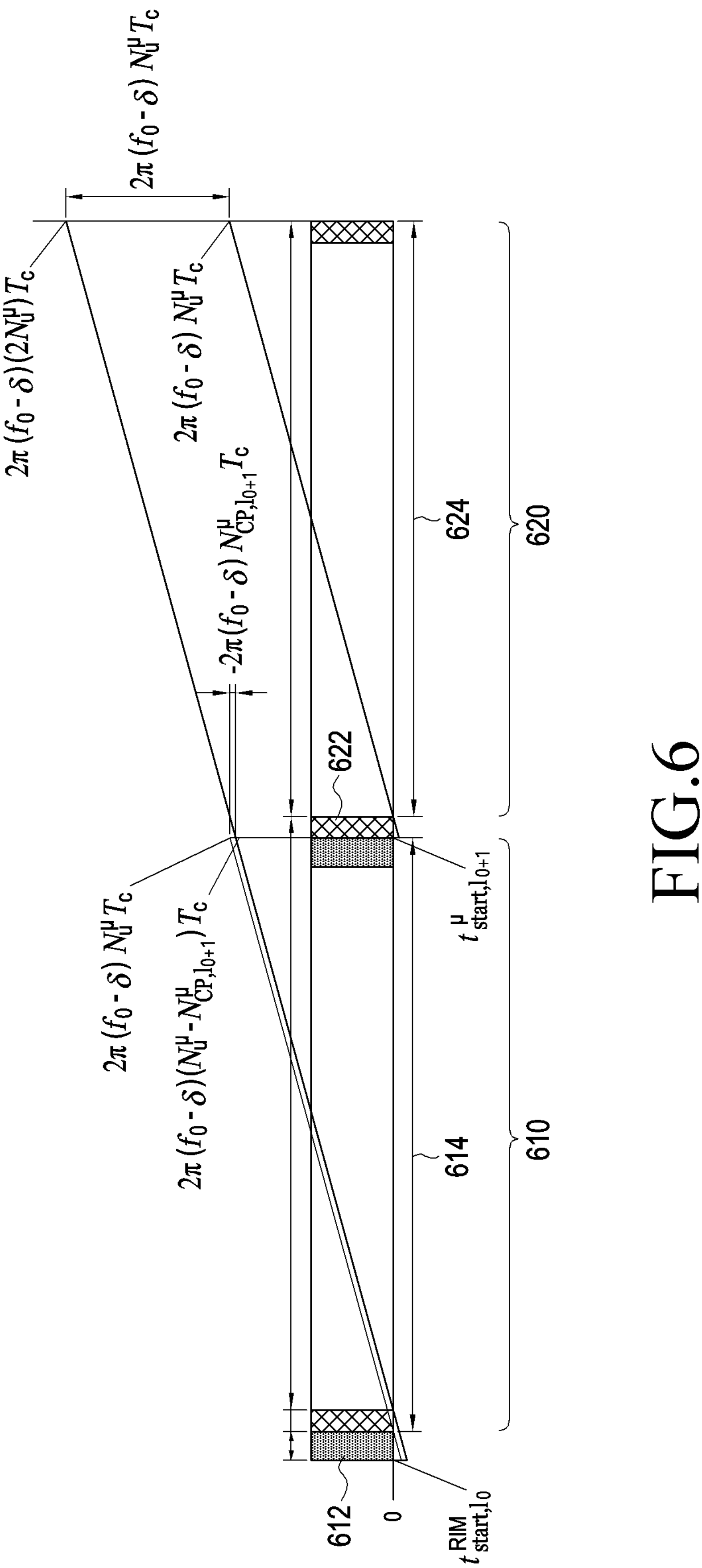
FIG. 6 illustrates phase de-compensation when CPs of two consecutive OFDM symbols are a long normal CP (NCP) and a short NCP according to an embodiment of the disclosure.

FIG. 6 illustrates phase de-compensation when CPs of two consecutive OFDM symbols are a long NCP and a short NCP according to an embodiment of the disclosure.

A first OFDM symbol 610 for a different channel and/or signal may have a long NCP 612 and a first net OFDM symbol 614, and a second OFDM symbol 620 for the different channel and/or signal may have a short NCP 622 and a second net OFDM symbol 624. Phase compensation for the different channel and/or signal may be reused or corrected by de-compensating a phase of a RIM RS (or a first OFDM symbol of the RIM RS) by $$-2\pi(f_0-\delta)N^{\mu}_{CP,l_{0+1}}T_c$$

for the first OFDM symbol 610 and de-compensating the phase of the RIM RS (or a second OFDM symbol of the RIM RS) by $$2\pi(f_0-\delta)N^{\mu}_{\mu}T_c$$

for the second OFDM symbol 620.

Figure 7:
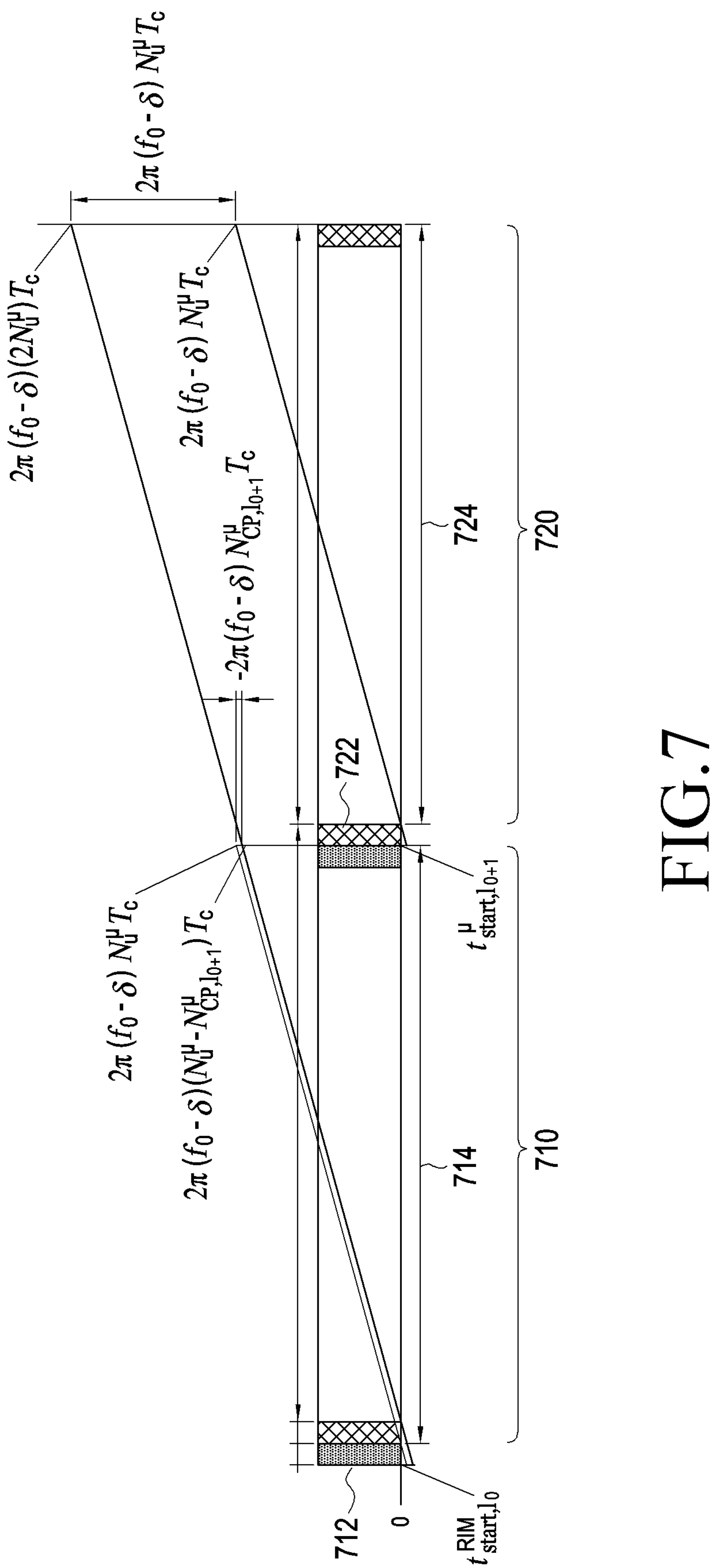
FIG. 7 illustrates phase de-compensation when CPs of two consecutive OFDM symbols are a short NCP and a short NCP according to an embodiment of the disclosure.

FIG. 7 illustrates phase de-compensation when CPs of two consecutive OFDM symbols are a short NCP and a short NCP according to an embodiment of the disclosure.

A first OFDM symbol 710 for a different channel and/or signal may have a short NCP 712 and a first net OFDM symbol 714, and a second OFDM symbol 720 for the different channel and/or signal may have a short NCP 722 and a second net OFDM symbol 724. Phase compensation for the different channel and/or signal may be reused or corrected by de-compensating a phase of a RIM RS (or a first OFDM symbol of the RIM RS) by $$-2\pi(f_0-\delta)N^{\mu}_{CP,l_{0+1}}T_c$$

for the first OFDM symbol 610 and de-compensating the phase of the RIM RS (or a second OFDM symbol of the RIM RS) by $$2\pi(f_0-\delta)N^{\mu}_{u}T_c$$

for the second OFDM symbol 620.

Figure 8:
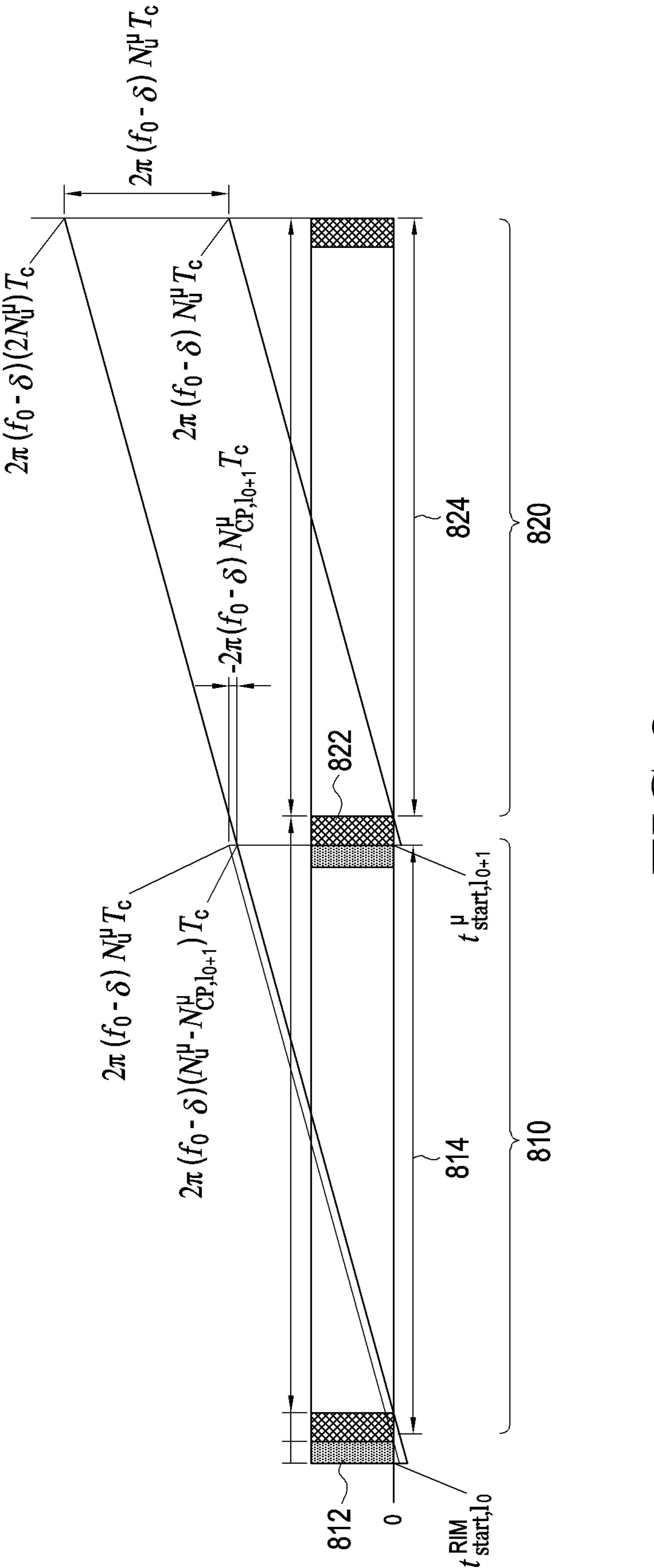
FIG. 8 illustrates phase de-compensation when CPs of two consecutive OFDM symbols are a short NCP and a long NCP according to an embodiment of the disclosure.

FIG. 8 illustrates phase de-compensation when CPs of two consecutive OFDM symbols are a short NCP and a long NCP according to an embodiment of the disclosure.

A first OFDM symbol 810 for a different channel and/or signal may have a short NCP 812 and a first net OFDM symbol 814, and a second OFDM symbol 820 for the different channel and/or signal may have a long NCP 822 and a second net OFDM symbol 824. Phase compensation for the different channel and/or signal may be reused or corrected by de-compensating a phase of a RIM RS (or a first OFDM symbol of the RIM RS) by $$-2\pi(f_0-\delta)N^{\mu}_{CP,l_{0+1}}T_c$$

for the first OFDM symbol 810 and de-compensating the phase of the RIM RS (or a second OFDM symbol of the RIM RS) by $$2\pi(f_0-\delta)N^{\mu}_{u}T_c$$

for the second OFDM symbol 820.

Figure 9:
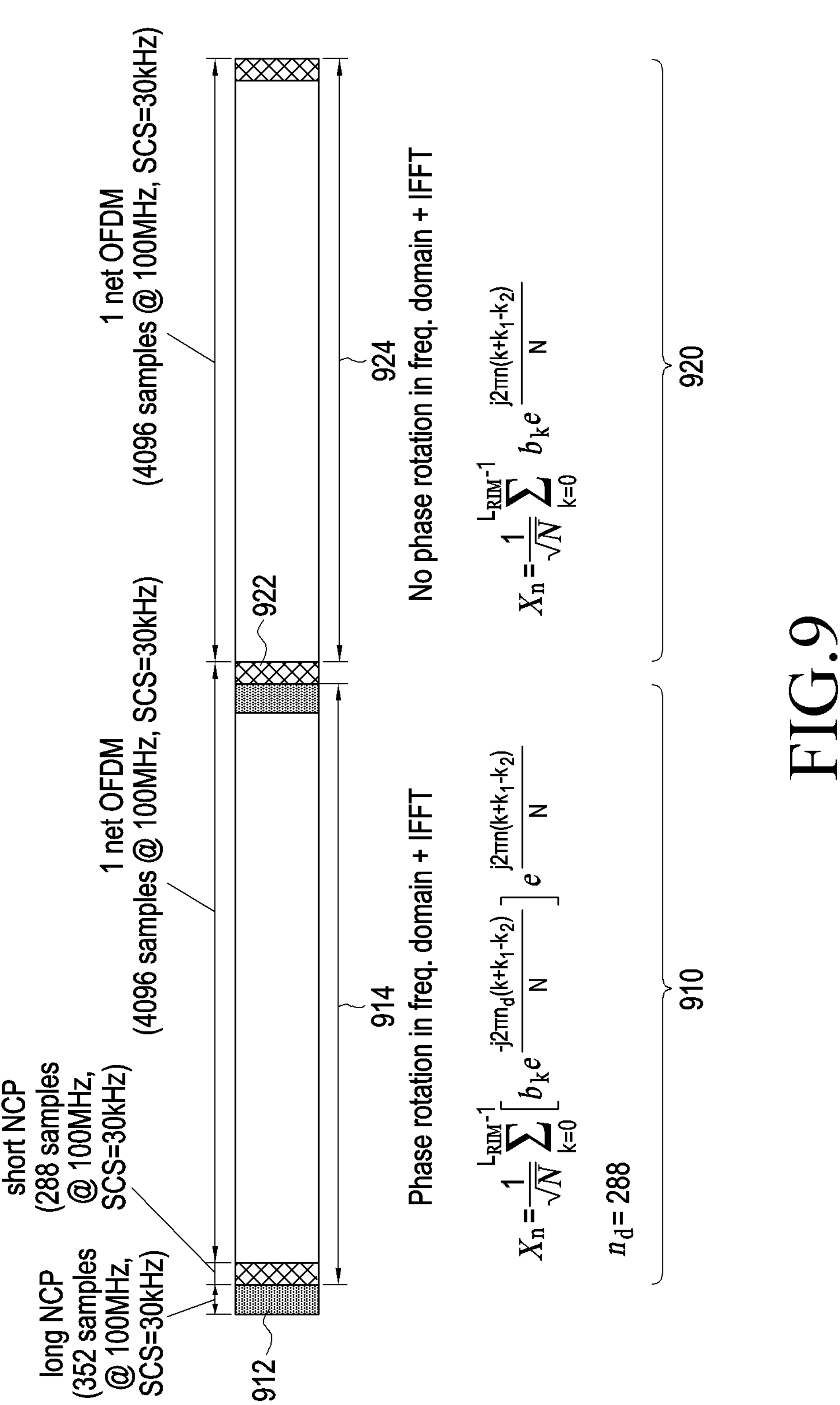
FIG. 9 illustrates a phase shift when CPs of two consecutive OFDM symbols are a long NCP and a short NCP according to an embodiment of the disclosure.

FIG. 9 illustrates a phase shift when CPs of two consecutive OFDM symbols are a long NCP and a short NCP according to an embodiment of the disclosure.

A first OFDM symbol 910 for a different channel and/or signal may have a long NCP 912 and a first net OFDM symbol 914, and a second OFDM symbol 920 for the different channel and/or signal may have a short NCP 922 and a second net OFDM symbol 924. A cyclic shift may be properly achieved in the time domain by rotating a phase of a RIM RS by $-2\pi(k+k_1-k_2)n_d/N$ for the first OFDM symbol 910 (without rotating the phase of the RIM RS for the second OFDM symbol 920). When SCS=30 kHz and channel BW=100 MHz, N=4096 and $n_d$=288. An equation related to $x_n$ illustrated in FIG. 9 may correspond to an item in [ ] in Equation 6.

Figure 10:
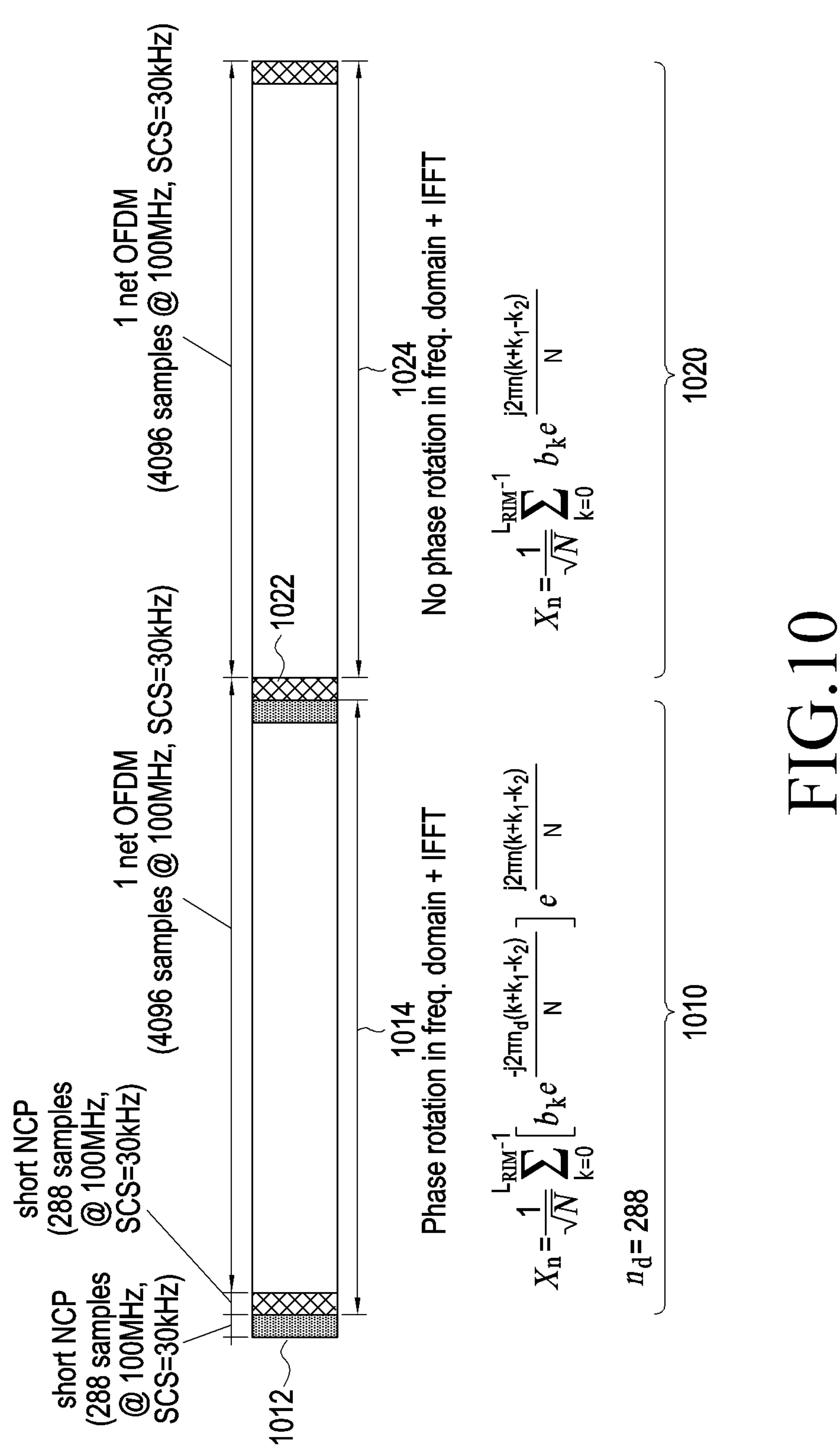
FIG. 10 illustrates a phase shift when CPs of two consecutive OFDM symbols are a short NCP and a short NCP according to an embodiment of the disclosure.

FIG. 10 illustrates a phase shift when CPs of two consecutive OFDM symbols are a short NCP and a short NCP according to an embodiment of the disclosure.

A first OFDM symbol 1010 for a different channel and/or signal may have a short NCP 1012 and a first net OFDM symbol 1014, and a second OFDM symbol 1020 for the different channel and/or signal may have a short NCP 1022 and a second net OFDM symbol 1024. A cyclic shift may be properly achieved in the time domain by rotating a phase of a RIM RS by $-2\pi(k+k_1+k_2)n_d/N$ for the first OFDM symbol 1010 (without rotating the phase of the RIM RS for the second OFDM symbol 1020). When SCS=30 kHz and channel BW=100 MHz, N=4096 and $n_d$=288.

Figure 11:
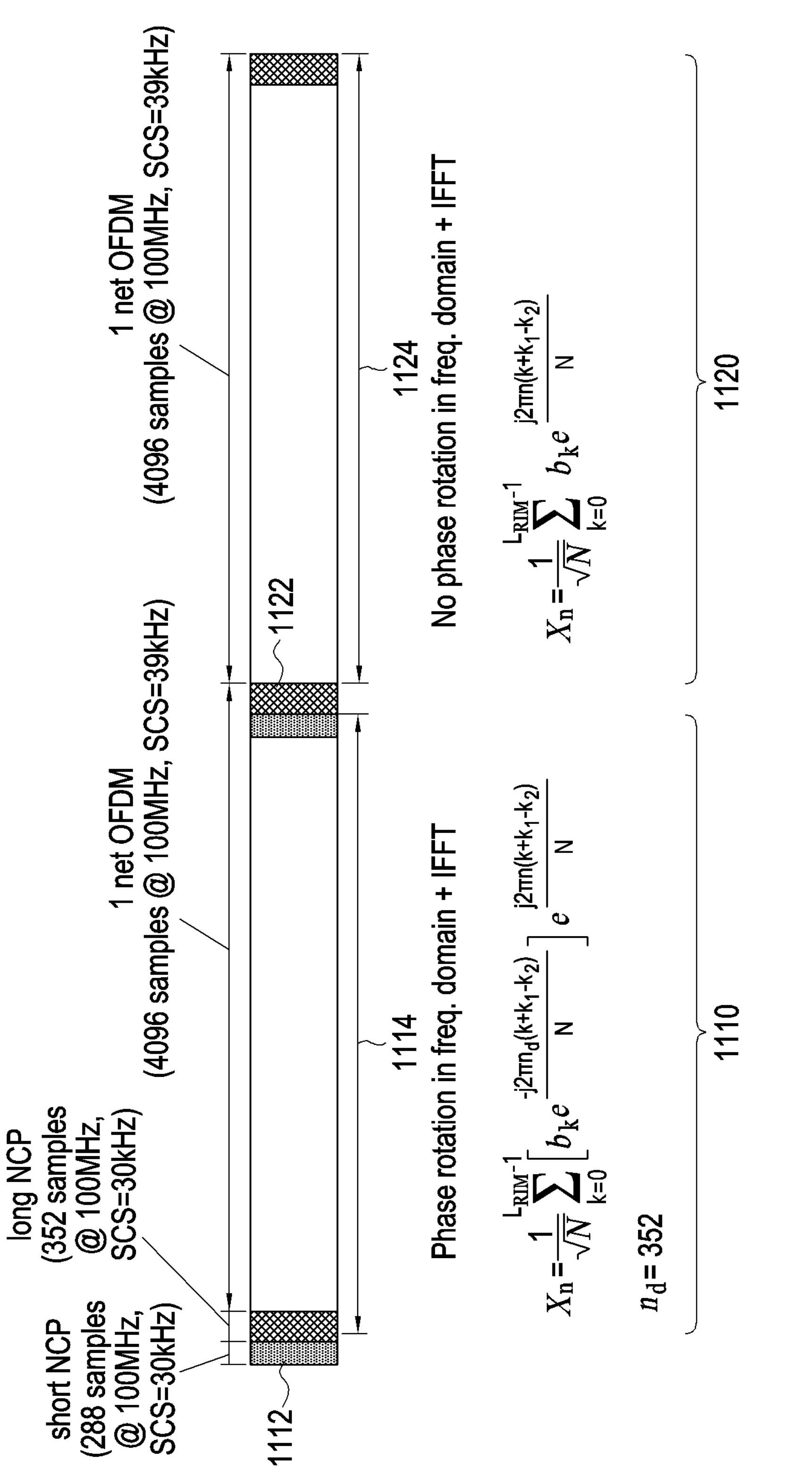
FIG. 11 illustrates a phase shift when CPs of two consecutive OFDM symbols are a short NCP and a long NCP according to an embodiment of the disclosure.

FIG. 11 illustrates a phase shift when CPs of two consecutive OFDM symbols are a short NCP and a long NCP according to an embodiment of the disclosure.

A first OFDM symbol 1110 for a different channel and/or signal may have a short NCP 1112 and a first net OFDM symbol 1114, and a second OFDM symbol 1120 for the different channel and/or signal may have a long NCP 1122 and a second net OFDM symbol 1124. A cyclic shift may be properly achieved in the time domain rotating a phase of a RIM RS by $-2\pi(k+k_1-k_2)n_d/N$ for the first OFDM symbol 1110 (without rotating the phase of the RIM RS for the second OFDM symbol 1120). When SCS=30 kHz and channel BW=100 MHz, N=4096 and $n_d$=352.

A difference between a carrier frequency for a different channel and signal and a remainder δ obtained by dividing a difference $f_d$ between the carrier frequency and a configured reference point by a subcarrier spacing may be defined as follows.

$$f_0-\delta=p\cdot 2.5\text{ kHz} \quad \text{Equation 14}$$

Here, p is an integer.

FIG. 12 illustrates a pseudo code for computing k2, p, and nco_value according to an embodiment of the disclosure.

FIG. 12 shows a pseudo code for computing Equations 4 and 14. Computed nco_value, which is a value to be transmitted to a component (e.g., a digital mixer or a numerically control oscillator (NCO)) that corrects a fractional frequency difference, may be transmitted to an RU supporting an RRH through a backhaul/fronthaul communication unit (e.g., the backhaul/fronthaul communication unit 120).

Figure 13:
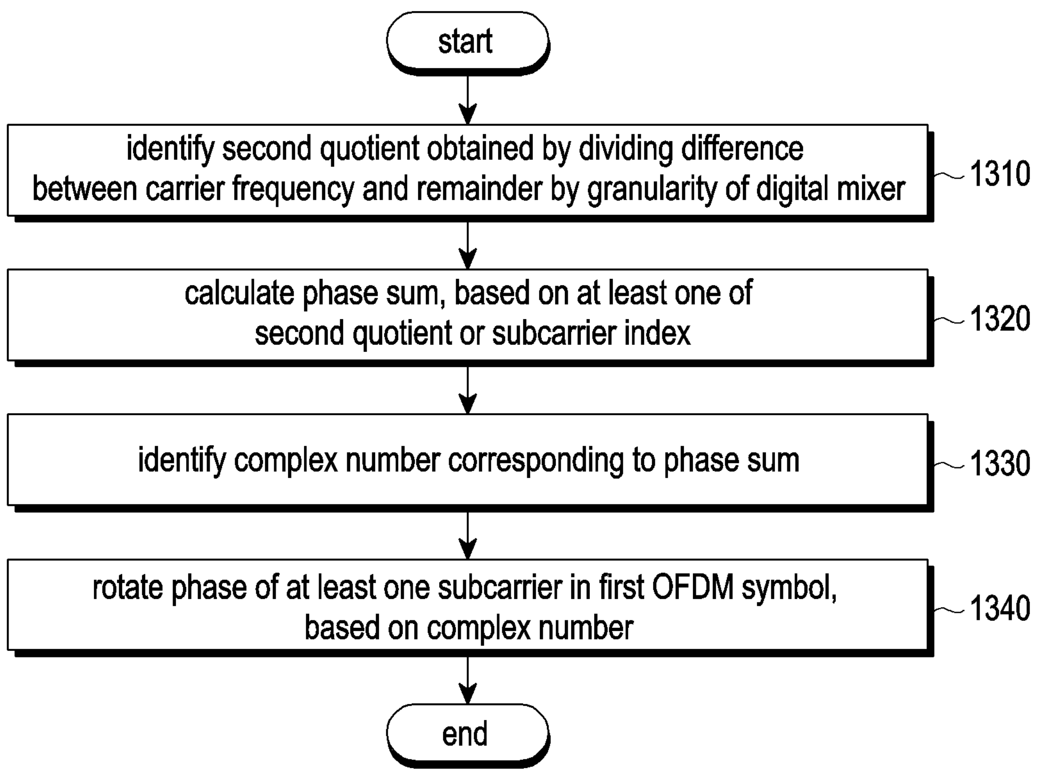
FIG. 13 is a flowchart illustrating a method of applying phase rotation according to an embodiment of the disclosure.

FIG. 13 is a flowchart illustrating a method of applying phase rotation according to an embodiment of the disclosure.

Referring to FIG. 13, a processor (e.g., the controller 140 of FIG. 1 or the controller 280 of FIG. 2) of an electronic device (e.g., the base station 101 of FIG. 1 or the transmitter 201 of FIG. 2) according to an embodiment may perform at least one of operation 1310 to operation 1340.

In operation 1310, the electronic device may identify a second quotient obtained by dividing a difference between a carrier frequency and a remainder obtained by dividing a difference between the carrier frequency and a configured reference point by a subcarrier spacing by a granularity of a digital mixer.

According to an embodiment of the disclosure, the electronic device may compute the difference between the carrier frequency $f_O$ for communication with a terminal (or for a different channel and/or signal) and the remainder δ obtained by dividing the difference $f_d$ between the carrier frequency and the configured reference point by the subcarrier spacing. The electronic device may obtain an integer quotient p obtained by dividing the difference between the carrier frequency $f_O$ and the remainder by a granularity of the digital mixer (or the frequency shifters 250 and 252) as the second quotient.

In operation 1320, the electronic device may obtain a phase sum, based on at least one of the second quotient and a subcarrier index.

According to an embodiment of the disclosure, the electronic device may compute the phase sum Θ, based on the second quotient p and $(k+k_1-k_2)$. k is the subcarrier index, $k_1$ is an index of a resource element to which a RIM RS QPSK symbol is first mapped, and $k_2$ is a first quotient obtained by dividing the difference between the carrier frequency and the configured reference point by the subcarrier spacing.

In operation 1330, the electronic device may identify a complex number corresponding to the phase sum.

According to an embodiment of the disclosure, the electronic device may retrieve cos(θ) and sin(θ) values from a table having finite items for first and second OFDM symbols.

According to an embodiment of the disclosure, the electronic device may approximately compute values the cos(θ) and sin(θ) values for the first and second OFDM symbols by using a Taylor expansion.

In operation 1340, the electronic device may rotate a phase of at least one subcarrier in the first OFDM symbol, based on the complex number.

According to an embodiment of the disclosure, for the first and second OFDM symbols, the electronic device may rotate the phase of the subcarrier by multiplying the RIM RS QPSK symbol by cos(θ) and sin(θ).

A method of applying phase rotation is illustrated as follows.

According to Equations 8 and 10, phase rotation for the first OFDM symbol is determined not by the length of a CP of the first OFDM symbol but by the length of a CP of the second OFDM symbol. When the second OFDM symbol has a short NCP, a phase rotation process for the first OFDM symbol is as follows. When $$\lambda_{l_0}^{(d)}\lambda_{l_0,k}^{(c)} = e^{j\theta_{l_0 k}}$$

is defined, Equation 15 may be derived by Equations 8, 10, and 14.

$$\theta_{l_0,k} = -2\pi\left(p\frac{3}{256}2^{-\mu} + (k + k_1 - k_2)\frac{9}{128}\right) \quad \text{Equation 15}$$

When SCS=30 kHz, that is, when μ=1, Equations 16 and 17 may be defined as follows.

$$k'(k+k_1-k_2)\%128 \quad \text{Equation 16}$$

$$p'=p\%512 \quad \text{Equation 17}$$

Equation 18 may be derived by putting Equations 16 and 17 into Equation 15.

$$\theta_{l_0,k} = -2\pi(12k' + p')\frac{3}{512} \quad \text{Equation 18}$$

For example, the electronic device may store a table of sine and cosine functions of a value obtained by dividing 2π by 512 in advance, and may multiply a value of $\cos(\theta_{l_0,k})$+j $\sin(\theta_{l_0,k})$, obtained with (−(12k'+p')·3)%512 as an input to the table, by $$a_k^{(p,RIM)}.$$

According to an embodiment of the disclosure, the electronic device may approximately compute values the cos(θ) and sin(θ) values by using the Taylor expansion.

When SCS=15 kHz, that is, when μ=0, Equations 19 and 20 may be defined as follows.

$$k'=(k+k_1-k_2)\%128 \quad \text{Equation 19}$$

$$p'=p\%256 \quad \text{Equation 20}$$

Equation 21 may be derived by putting Equations 19 and 20 into Equation 15.

$$\theta_{l_0,k} = -2\pi(6k' + p')\frac{3}{256} \quad \text{Equation 21}$$

For example, the electronic device may store a table of sine and cosine functions of a value obtained by dividing 2π by 256 in advance, and may multiply a value of $\cos(\theta_{l_0,k})$+j $\sin(\theta_{l_0,k})$, obtained with (−(6k'+p'z)·3)%256 as an input to the table, by $$a_k^{(p,RIM)}.$$

According to an embodiment of the disclosure, instead of the table, a table of sine and cosine functions prepared for μ−1 may be reused, in which case those skilled in the art may easily modify and use the equations.

According to an embodiment of the disclosure, the electronic device may approximately compute values the cos(θ) and sin(θ) values by using the Taylor expansion.

When the second OFDM symbol has a long NCP, a phase rotation process for the first OFDM symbol is as follows. When $$\lambda_{l_0}^{(d)}\lambda_{l_0,k}^{(c)} = e^{j\theta_{l_0 k}}$$

is defined, Equation 22 may be derived by Equations 8, 10, and 14.

$$\theta_{l_0,k} = -2\pi\left(p\frac{9\cdot 2^{1-\mu}+2}{1536} + (k + k_1 - k_2)\frac{9+2^{\mu}}{128}\right) \quad \text{Equation 22}$$

When SCS=30 kHz, that is, when μ=1, Equations 23 and 24 may be defined as follows.

$$k'=(k+k_1-k_2)\%128 \quad \text{Equation 23}$$

$$p'=p\%1536 \quad \text{Equation 24}$$

Equation 25 may be derived by putting Equations 23 and 24 into Equation 22.

$$\theta_{l_0,k} = -2\pi + (12k' + p')\frac{11}{1536} \quad \text{Equation 25}$$

For example, the electronic device may store a table of sine and cosine functions of a value obtained by dividing 2π by 1536 in advance, and may multiply a value of $\cos(\theta_{l_0,k})$+j $\sin(\theta_{l_0,k})$, obtained with (−(12k'+p')·11)%1536 as an input to the table, $$a_k^{(p,RIM)}.$$

According to an embodiment of the disclosure, the electronic device may approximately compute values the cos(θ) and sin(θ) values by using the Taylor expansion.

When SCS=15 kHz, that is, when μ=0, Equations 26 and 27 may be defined as follows.

$$k'=(k+k_1-k_2)\%128 \quad \text{Equation 26}$$

$$p'=p\%384 \quad \text{Equation 27}$$

Equation 28 may be derived by putting Equations 26 and 27 into Equation 22.

$$\theta_{l_0,k} = -2\pi(6k' + p')\frac{5}{384} \quad \text{Equation 28}$$

For example, the electronic device may store a table of sine and cosine functions of a value obtained by dividing 2π by 384 in advance, and may multiply a value of $\cos(\theta_{l_0,k})+j\sin(\theta_{l_0,k})$, obtained with (−(6k'+p')%384 as an input to the table, $$a_k^{(p,RIM)}.$$

According to an embodiment of the disclosure, instead of the table, a table of sine and cosine functions prepared for μ=1 may be reused, in which case those skilled in the art may easily modify and use the equations.

According to an embodiment of the disclosure, the electronic device may approximately compute values the cos(θ) and sin(θ) values by using the Taylor expansion.

A phase rotation process for the second OFDM symbol is as follows. A phase rotation value for the second OFDM symbol is regardless of a CP length. When $$\lambda_{l_0+1}^{(d)} = e^{j\theta_{l_0+1}}$$

is defined, Equation 29 may be derived by Equations 13 and 14.

$$\theta_{l_0+1} = 2\pi p\frac{2^{-\mu}}{6} \quad \text{Equation 29}$$

When SCS=30 kHz, that is, when μ=1, Equation 30 may be defined as follows.

$$p'=p\%12 \quad \text{Equation 30}$$

Equation 31 may be derived by putting Equation 30 into Equation 29.

$$\theta_{l_0+1} = 2\pi p'\frac{1}{12} \quad \text{Equation 31}$$

For example, the electronic device may store a table of sine and cosine functions of a value obtained by dividing 2π by 12 in advance, and may multiply a value of $\cos(\theta_{l_0+1})+j\sin(\theta_{l_0+1})$, obtained with (−p')%12 as an input to the table, by $$a_k^{(p,RIM)}.$$

According to an embodiment of the disclosure, the electronic device may approximately compute values the cos(θ) and sin(θ) values by using the Taylor expansion.

When SCS=15 kHz, that is, when μ−1, Equation 32 may be defined as follows.

$$p'=p\%6 \quad \text{Equation 32}$$

Equation 33 may be derived by putting Equation 32 into Equation 29.

$$\theta_{l_0+1} = 2\pi p'\frac{1}{6} \quad \text{Equation 33}$$

For example, the electronic device may store a table of sine and cosine functions of a value obtained by dividing 2π by 6 in advance, and may multiply a value of $\cos(\theta_{l_0+1})+j\sin(\theta_{l_0+1})$, obtained with (−p') %6 as an input to the table, by $$a_k^{(p,RIM)}.$$

According to an embodiment of the disclosure, the electronic device may approximately compute values the cos(θ) and sin(θ) values by using the Taylor expansion.

FIG. 14 illustrates a pseudo code for computing a subcarrier index and a RIM RS index according to an embodiment of the disclosure.

Referring to FIG. 14 shows a pseudo code for computing a start subcarrier index of a RIM RS symbol to be carried on an actual transmission bandwidth (BW) and the length of a used subcarrier according to a fast Fourier transform (FFT)/inverse FFT (IFFT) size of a signal for a different channel/signal other than a RIM RS and for computing the position and length of a start symbol of the RIM RS to be carried on the actual transmission bandwidth. Here, RIM_f_offset_start is a start frequency offset of the RIM RS.

Figure 15:
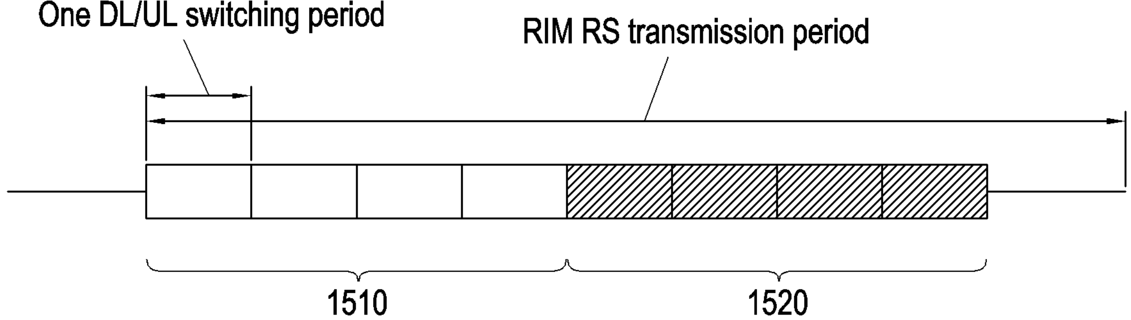
FIG. 15 illustrates an example of transmitting a RIM RS according to an embodiment of the disclosure.

FIG. 15 illustrates an example of transmitting a RIM RS according to an embodiment of the disclosure. FIG. 15 illustrates a configuration for transmitting a RIM RS during a RIM RS transmission period. A RIM RS may be transmitted once from one transmission base station during a DL/UL switching period. A switching period number is a time-related resource, a specific frequency domain of a channel BW is a frequency-related resource, and a scrambling ID when the RIM RS is generated is a code-related resource. In the NR Release 16 standard, eight RIM RS s (one per period) may be transmitted during up to eight contiguous DL/UL switching periods.

To provide a near/far (NF) function and improve reception detection performance, four periods 1510 may be allocated so that a base station at a short distance may detect a RIM RS (the RIM RS is periodically transmitted four times at a specific OFDM symbol position), and four periods 1520 may be allocated so that a base station at a long distance may detect a RIM RS (the RIM RS is periodically transmitted four times at another specific OFDM symbol position). Each RIM RS may have the same configuration as the two OFDM symbols for the different channel and/or signal illustrated in FIG. 6, that is, a configuration in which the first OFDM symbol including a first CP (or first NCP) and the first net OFDM symbol and the second OFDM symbol including a second CP (or second NCP) and the second net OFDM symbol are consecutively disposed.

Figure 16:
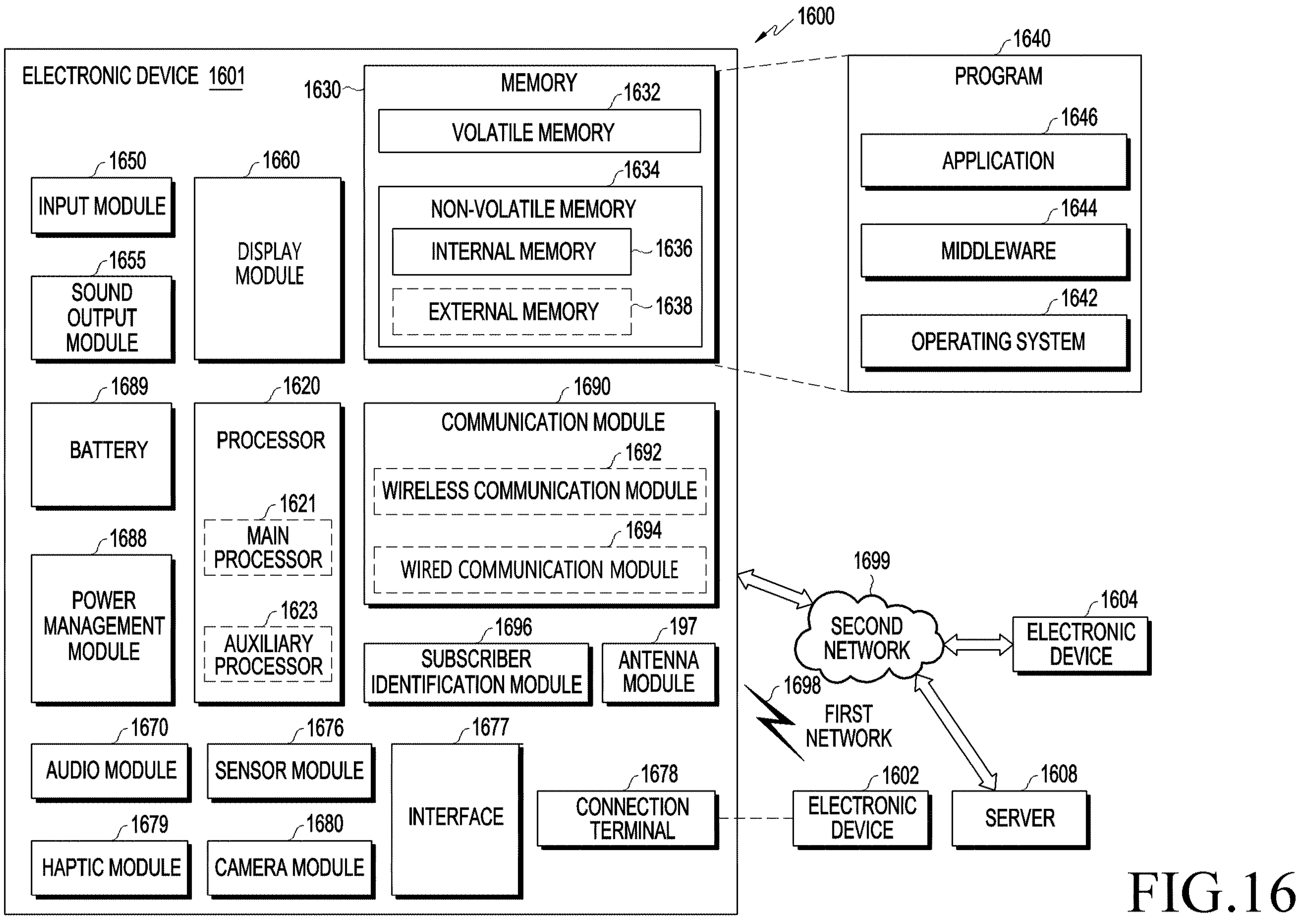
FIG. 16 is a block diagram of an electronic device in a network environment according to an embodiment of the disclosure.

FIG. 16 is a block diagram illustrating an electronic device 1601 in a network environment 1600 according to an embodiment of the disclosure. Referring to FIG. 16, the electronic device 1601 in the network environment 1600 may communicate with an external electronic device 1602 via a first network 1698 (e.g., a short-range wireless communication network), or an external electronic device 1604 or a server 1608 via a second network 1699 (e.g., a long-range wireless communication network). According to an embodiment of the disclosure, the electronic device 1601 may communicate with the external electronic device 1604 via the server 1608. According to an embodiment of the disclosure, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments of the disclosure, at least one of the components (e.g., the connecting terminal 1678) may be omitted from the electronic device 1601, or one or more other components may be added in the electronic device 1601. In some embodiments of the disclosure, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment of the disclosure, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. According to an embodiment of the disclosure, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control, for example, at least some of functions or states related to at least one component (e.g., the display module 1660, the sensor module 1676, or the communication module 1690) among the components of the electronic device 1601, instead of the main processor 1621 while the main processor 1621 is in an inactive (e.g., a sleep) state, or together with the main processor 1621 while the main processor 1621 is in an active (e.g., executing an application) state. According to an embodiment of the disclosure, the auxiliary processor 1623 (e.g., an image signal processor or a communication processor) may be implemented as part of another component (e.g., the camera module 1680 or the communication module 1690) functionally related to the auxiliary processor 1623. According to an embodiment of the disclosure, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. According to an embodiment of the disclosure, the display module 1660 may include a touch sensor adapted to detect a touch, or a pressure sensor adapted to measure the intensity of force incurred by the touch.

The audio module 1670 may convert a sound into an electrical signal and vice versa. According to an embodiment of the disclosure, the audio module 1670 may obtain the sound via the input module 1650, or output the sound via the sound output module 1655 or an external electronic device (e.g., the external electronic device 1602 (e.g., a speaker or a headphone)) directly or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment of the disclosure, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the external electronic device 1602) directly or wirelessly. According to an embodiment of the disclosure, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the external electronic device 1602). According to an embodiment of the disclosure, the connecting terminal 1678 may include, for example, an HDMI connector, a USB connector, an SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1679 may include, for example, a motor, a piezoelectric element, or an electric stimulator.

The camera module 1680 may capture a still image or moving images. According to an embodiment of the disclosure, the camera module 1680 may include one or more lenses, image sensors, image signal processors, or flashes.

The power management module 1688 may manage power supplied to the electronic device 1601. According to one embodiment of the disclosure, the power management module 1688 may be implemented as at least part of, for example, a power management integrated circuit (PMIC).

The battery 1689 may supply power to at least one component of the electronic device 1601. According to an embodiment of the disclosure, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the external electronic device 1602, the external electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment of the disclosure, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device 1604 via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify or authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the external electronic device 1604), or a network system (e.g., the second network 1699). According to an embodiment of the disclosure, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device) of the electronic device 1601. According to an embodiment of the disclosure, the antenna module 1697 may include an antenna including a radiating element including a conductive material or a conductive pattern formed in or on a substrate (e.g., a printed circuit board (PCB)). According to an embodiment of the disclosure, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 from the plurality of antennas. The signal or the power may then be transmitted or received between the communication module 1690 and the external electronic device via the selected at least one antenna. According to an embodiment of the disclosure, another component (e.g., a radio frequency integrated circuit (RFIC)) other than the radiating element may be additionally formed as part of the antenna module 1697.

According to various embodiments of the disclosure, the antenna module 1697 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1601 and the external electronic device 1604 via the server 1608 coupled with the second network 1699. Each of the external electronic devices 1602 or 1604 may be a device of a same type as, or a different type, from the electronic device 1601. According to an embodiment of the disclosure, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment of the disclosure, the external electronic device 1604 may include an internet-of-things (IoT) device. The server 1608 may be an intelligent server using machine learning and/or a neural network. According to an embodiment of the disclosure, the external electronic device 1604 or the server 1608 may be included in the second network 1699. The electronic device 1601 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “1st” and “2nd”, or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic”, “logic block”, “part”, or “circuitry”. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1640) including one or more instructions that are stored in a storage medium (e.g., an internal memory 1636 or an external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device in a wireless communication system, the electronic device comprising:
communication circuitry;
memory, comprising one or more storage media, storing instructions; and
at least one processor communicatively coupled to the communication circuitry and the memory,
wherein the instructions, when executed by the at least one processor individually or collectively, cause the electronic device to:
identify a difference between a carrier frequency for communication with a terminal and a reference point configured for a remote interference management (RIM) reference signal (RS),
identify a first quotient and a remainder obtained by dividing the difference by a subcarrier spacing,
rotate a phase of at least one subcarrier in a first orthogonal frequency-division multiplexing (OFDM) symbol comprising at least part of the RIM RS, based on at least one of a cyclic prefix (CP) length of a second OFDM symbol comprising at least different part of the RIM RS, the carrier frequency, or the remainder,
rotate a phase of at least one subcarrier in the second OFDM symbol, based on at least one of the carrier frequency or the remainder, and
transmit the RIM RS comprising the first OFDM symbol and the second OFDM symbol via the communication circuitry.

2. The electronic device of claim 1, wherein the instructions, when executed by the at least one processor individually or collectively, further cause the electronic device to:
rotate the phase of the at least one subcarrier in the first OFDM symbol, at least partly based on a difference between the carrier frequency and the remainder.

3. The electronic device of claim 1, wherein the instructions, when executed by the at least one processor individually or collectively, further cause the electronic device to:
rotate the phase of the at least one subcarrier in the first OFDM symbol, at least partly based on the CP length of the second OFDM symbol and a difference between the carrier frequency and the remainder.

4. The electronic device of claim 1, wherein the instructions, when executed by the at least one processor individually or collectively, further cause the electronic device to:
firstly rotate the phase of the at least one subcarrier in the first OFDM symbol, based on at least one of the CP length of the second OFDM symbol, the carrier frequency, or the remainder, and
secondly rotate the phase of the at least one subcarrier in the first OFDM symbol, based on at least one of the CP length of the second OFDM symbol or a subcarrier index.

5. The electronic device of claim 1, wherein the instructions, when executed by the at least one processor individually or collectively, further cause the electronic device to;
rotate the phase of the at least one subcarrier in the second OFDM symbol, at least partly based on a difference between the carrier frequency and the remainder.

6. The electronic device of claim 1, wherein the instructions, when executed by the at least one processor individually or collectively, further cause the electronic device to:
rotate the phase of the at least one subcarrier in the second OFDM symbol, at least partly based on a net OFDM symbol length and a difference between the carrier frequency and the remainder.

7. The electronic device of claim 1, wherein the instructions, when executed by the at least one processor individually or collectively, further cause the electronic device to:
identify a second quotient obtained by dividing a difference between the carrier frequency and the remainder by a granularity of a digital mixer,
calculate a phase sum, based on at least one of the second quotient or a subcarrier index,
identify a complex number corresponding to the phase sum, and
rotate the phase of the at least one subcarrier in the first OFDM symbol, based on the complex number.

8. The electronic device of claim 7, wherein the instructions, when executed by the at least one processor individually or collectively, further cause the electronic device to:
identify the complex number corresponding to the phase sum, at least partly based on a cosine and sine table or a Taylor expansion.

9. The electronic device of claim 7, wherein the instructions, when executed by the at least one processor individually or collectively, further cause the electronic device to;
multiply the complex number by a quadrature phase shift keying (QPSK) symbol of the RIM RS.

10. The electronic device of claim 7, wherein the instructions, when executed by the at least one processor individually or collectively, further cause the electronic device to:
identify a second quotient obtained by dividing a difference between the carrier frequency and the remainder by a granularity of a digital mixer,
calculate a phase sum, based on at least one of the second quotient or a subcarrier index,
identify a complex number corresponding to the phase sum, and
rotate the phase of the at least one subcarrier in the second OFDM symbol, based on the complex number.

11. A method for providing a remote interference management (RIM) reference signal (RS) by an electronic device in a wireless communication system, the method comprising:
identifying, by at least one processor of the electronic device, a difference between a carrier frequency for communication with a terminal and a reference point configured for a RIM RS;
identifying, by the at least one processor, a first quotient and a remainder obtained by dividing the difference by a subcarrier spacing;
rotating, by the at least one processor, a phase of at least one subcarrier in a first orthogonal frequency-division multiplexing (OFDM) symbol comprising at least part of the RIM RS, based on at least one of a cyclic prefix (CP) length of a second OFDM symbol comprising at least different part of the RIM RS, the carrier frequency, or the remainder;
rotating, by the at least one processor, a phase of at least one subcarrier in the second OFDM symbol, based on at least one of the carrier frequency or the remainder; and transmitting, by the at least one processor via communication circuitry of the electronic device, the RIM RS comprising the first OFDM symbol and the second OFDM symbol.

12. The method of claim 11, wherein the rotating of the phase of the at least one subcarrier in the first OFDM symbol comprises:

firstly rotating the phase of the at least one subcarrier in the first OFDM symbol, based on at least one of the CP length of the second OFDM symbol, the carrier frequency, or the remainder; and secondly rotating the phase of the at least one subcarrier in the first OFDM symbol, based on at least one of the CP length of the second OFDM symbol or a subcarrier index.

13. The method of claim 11, wherein the rotating of the phase of the at least one subcarrier in the first OFDM symbol comprises:

identifying a second quotient obtained by dividing a difference between the carrier frequency and the remainder by a granularity of a digital mixer;

calculating a phase sum, based on at least one of the second quotient or a subcarrier index;

identifying a complex number corresponding to the phase sum; and rotating the phase of the at least one subcarrier in the first OFDM symbol, based on the complex number.

14. The method of claim 13, wherein the rotating of the phase of the at least one subcarrier in the first OFDM symbol, based on the complex number comprises multiplying the complex number by a quadrature phase shift keying (QPSK) symbol of the RIM RS.

15. The method of claim 13, wherein the rotating of the phase of the at least one subcarrier in the second OFDM symbol comprises:

identifying a second quotient obtained by dividing a difference between the carrier frequency and the remainder by a granularity of a digital mixer;

calculating a phase sum, based on at least one of the second quotient or a subcarrier index;

identifying a complex number corresponding to the phase sum; and rotating the phase of the at least one subcarrier in the second OFDM symbol, based on the complex number.

16. A non-transitory computer-readable storage medium for storing instructions which, when executed by at least one processor of an electronic device, control the electronic device to perform:

identifying, by at least one processor of the electronic device, a difference between a carrier frequency for communication with a terminal and a reference point configured for a RIM RS;

identifying, by the at least one processor, a first quotient and a remainder obtained by dividing the difference by a subcarrier spacing;

rotating, by the at least one processor, a phase of at least one subcarrier in a first orthogonal frequency-division multiplexing (OFDM) symbol comprising at least part of the RIM RS, based on at least one of a cyclic prefix (CP) length of a second OFDM symbol comprising at least different part of the RIM RS, the carrier frequency, or the remainder;

rotating, by the at least one processor, a phase of at least one subcarrier in the second OFDM symbol, based on at least one of the carrier frequency or the remainder; and transmitting, by the at least one processor via communication circuitry of the electronic device, the RIM RS comprising the first OFDM symbol and the second OFDM symbol.

17. The non-transitory computer-readable storage medium of claim 16, wherein the rotating of the phase of the at least one subcarrier in the first OFDM symbol comprises:

firstly rotating the phase of the at least one subcarrier in the first OFDM symbol, based on at least one of the CP length of the second OFDM symbol, the carrier frequency, or the remainder; and secondly rotating the phase of the at least one subcarrier in the first OFDM symbol, based on at least one of the CP length of the second OFDM symbol or a subcarrier index.

18. The non-transitory computer-readable storage medium of claim 16, wherein the rotating of the phase of the at least one subcarrier in the first OFDM symbol comprises:

identifying a second quotient obtained by dividing a difference between the carrier frequency and the remainder by a granularity of a digital mixer;

calculating a phase sum, based on at least one of the second quotient or a subcarrier index;

identifying a complex number corresponding to the phase sum; and rotating the phase of the at least one subcarrier in the first OFDM symbol, based on the complex number.

19. The non-transitory computer-readable storage medium of claim 18, wherein the rotating of the phase of the at least one subcarrier in the first OFDM symbol, based on the complex number comprises multiplying the complex number by a quadrature phase shift keying (QPSK) symbol of the RIM RS.

20. The non-transitory computer-readable storage medium of claim 18, wherein the rotating of the phase of the at least one subcarrier in the second OFDM symbol comprises:

identifying a second quotient obtained by dividing a difference between the carrier frequency and the remainder by a granularity of a digital mixer;

calculating a phase sum, based on at least one of the second quotient or a subcarrier index;

identifying a complex number corresponding to the phase sum; and rotating the phase of the at least one subcarrier in the second OFDM symbol, based on the complex number.

* * * * *